(12) United States Patent
Teyeb et al.

(10) Patent No.: US 10,728,947 B2
(45) Date of Patent: Jul. 28, 2020

(54) USER EQUIPMENT, NODES AND METHODS PERFORMED THEREIN

(71) Applicant: Telefonaktiebolaget LM Ericsson (publ), Stockholm (SE)

(72) Inventors: Oumer Teyeb, Solna (SE); Gunnar Mildh, Sollentuna (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/276,362

(22) Filed: Feb. 14, 2019

(65) Prior Publication Data

US 2019/0182881 A1 Jun. 13, 2019

Related U.S. Application Data

(63) Continuation of application No. PCT/SE2018/051061, filed on Oct. 18, 2018.
(Continued)

(51) Int. Cl.
*H04W 76/15* (2018.01)
*H04W 76/19* (2018.01)
(Continued)

(52) U.S. Cl.
CPC ............ *H04W 76/15* (2018.02); *H04L 5/001* (2013.01); *H04W 16/32* (2013.01); *H04W 76/18* (2018.02);
(Continued)

(58) Field of Classification Search
CPC ... H04W 16/32; H04W 72/08; H04W 72/085; H04W 76/15; H04W 76/18; H04W 76/27;
(Continued)

(56) References Cited

U.S. PATENT DOCUMENTS

2016/0212753 A1* 7/2016 Wu .................... H04W 72/085
2016/0219604 A1* 7/2016 Fujishiro ............ H04W 72/085

FOREIGN PATENT DOCUMENTS

| EP | 3051916 A1 | 8/2016 |
| WO | 2015115034 A1 | 8/2015 |

OTHER PUBLICATIONS

Invitation to Pay Additional Fees and Communication Relating to the Results of the Partial International Search dated Jan. 29, 2019 for International Application PCT/SE2018/051061, Filed on Oct. 18, 2018, consisting of 15-pages.
(Continued)

*Primary Examiner* — Khoa Huynh
(74) *Attorney, Agent, or Firm* — Christopher & Weisberg, P.A.

(57) ABSTRACT

A method performed by a user equipment, UE, for handling communication in a wireless communication network, providing dual connectivity, DC, communication through a master node using a master cell group, MCG, over a first radio interface between the UE and the master node and through a secondary node using a secondary cell group, SCG, over a second radio interface between the UE and the secondary node. The UE detects a failure associated with the SCG and suspends actions associated with the SCG. The UE further performs a reconfiguration of the SCG in case the UE has received a MCG radio resource control, RRC, message comprising SCG configuration, wherein performing the reconfiguration of SCG comprises applying the reconfiguration; and resuming or not resuming the actions associated with the suspended SCG.

8 Claims, 21 Drawing Sheets

Related U.S. Application Data

(60) Provisional application No. 62/584,158, filed on Nov. 10, 2017.

(51) Int. Cl.
  *H04L 5/00*    (2006.01)
  *H04W 76/18*   (2018.01)
  *H04W 76/27*   (2018.01)
  *H04W 16/32*   (2009.01)
  *H04W 80/02*   (2009.01)
  *H04W 80/08*   (2009.01)
  *H04W 76/34*   (2018.01)
  *H04W 76/20*   (2018.01)
  *H04W 76/16*   (2018.01)

(52) U.S. Cl.
  CPC .......... *H04W 76/19* (2018.02); *H04W 76/27* (2018.02); *H04W 80/02* (2013.01); *H04W 80/08* (2013.01); *H04L 5/0098* (2013.01); *H04W 76/16* (2018.02); *H04W 76/20* (2018.02); *H04W 76/34* (2018.02)

(58) Field of Classification Search
  CPC ..... H04W 80/02; H04W 80/08; H04W 76/16; H04W 76/19; H04W 76/20; H04W 76/34; H04L 5/001; H04L 5/0091; H04L 5/0098
  See application file for complete search history.

(56) References Cited

OTHER PUBLICATIONS

3GPP TSG-RAN WG2 Ad Hoc R2-1707417, Title: SCG recovery upon SN failure for EN-DC; Source: Huawei, HiSilicon; Agenda Item: 10.2.14; Document for: Discussion and Decision; Location and Date: Qingdao, China, Jun. 27-29, 2017, consisting of 2-pages.

3GPP TSG-RAN WG2 Meeting #87 R2-144540, Title: Report and summary of email discussion [87#22] [LTE/DC] S-RLF and Reestablishment; Source: Huawei (Rapporteur); Agenda Item: 7.1.2.2; Document for: Discussion; Location and Date: Shanghai, China, Oct. 6-10, 2014, consisting of 29-pages.

3GPP TSG-RAN WG2 #97bis Tdoc R2-1702705, Title: SCG SRB configuration and use in LTE-NR interworking; Source: Ericsson; Agenda Item: 10.2.2.2; Document for: Discussion, Decision; Location and Date: Spokane, USA, Apr. 3-7, 2017, consisting of 6-pages.

3GPP TS 37.340 V1.1.1 3rd Generation Partnership Project; Technical Specification Group Radio Access Network; Evolved Universal Terrestrial Radio Access (E-UTRA) and NR; Multi-connectivity; Stage 2 (Release 15), Oct. 2017, consisting of 56-pages.

3GPP TRS 38.912 V14.1.0 3rd Generation Partnership Project; Technical Specification Group Radio Access Network; Study on New Radio (NR) access technology (Release 14), Jun. 2017, consisting of 74-pages.

3GPP TSG-RAN WG2 #99bis R2-1711139, Title: SCG reconfiguration failure handling for EN-DC; Source: Ericsson; Agenda Item: 10.4.1.3.4; Document for: Discussion, Decision; Location and Date: Prague, Czech Republic, Oct. 9-13, 2017, consisting of 8-pages.

3GPP TSG-RAN WG2 Meeting #99bis R2-1710622, Title: Further details on SRB3 handling; Source: Intel Corporation; Agenda Item: 10.4.1.3.4; Document for: Discussion and Decision; Location and Date: Prague, Czech Republic, Oct. 9-13, 2017, consisting of 3-pages.

3GPP TS 38.304 V0.0.5 3rd Generation Partnership Project; Technical Specification Group Radio Access Network; New Generation Radio Access Network; User Equipment (UE) procedures in Idle mode (Release 15), Oct. 2017, consisting of 13-pages.

3GPP TS 36.300 V14.4.0 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 14), Sep. 2017, consisting of 329-pages.

* cited by examiner

USER EQUIPMENT, NODES AND METHODS PERFORMED THEREIN

CROSS-REFERENCE TO RELATED APPLICATIONS

This application is a continuation of International Application No. PCT/SE2018/051061, filed Oct. 18, 2018, which claims the benefit of U.S. Provisional Application No. 62/584,158, filed on Nov. 10, 2017, the entireties of both of which are incorporated herein by reference.

FIELD

Embodiments herein relate to a user equipment, a master node, a secondary node and methods performed therein for communication. In particular embodiments herein relate handle communication in a wireless network e.g. for avoiding race conditions during Secondary Cell Group (SCG) failure handling.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In LTE, the Radio Resource Control (RRC) protocol is used to configure/setup and maintain the radio connection between a user equipment (UE) and a network node such as an evolved NodeB (eNB). When the UE receives an RRC message from the eNB, it will apply the configuration (the term "compile" may also be used to refer to the application of the configuration), and if this succeeds the UE generates an RRC complete message that indicates a transaction identity (ID) of the RRC message that triggered this response.

Since LTE-release 8, three Signalling Radio Bearers (SRBs), namely SRB0, SRB1 and SRB2 have been available for the transport of RRC and Non Access Stratum (NAS) messages between the UE and eNB. A new SRB, known as SRB1bis, was also introduced in rel-13 for supporting Data Over NAS (DoNAS) in Narrowband-Internet of things (NB-IoT).

SRB0 is for RRC messages using a Common Control Channel (CCCH) logical channel, and it is used for handling RRC connection setup, RRC connection resume and RRC connection re-establishment. Once the UE is connected to the eNB, i.e. RRC connection setup or RRC connection reestablishment/resume has succeeded, SRB1 is used for handling RRC messages, which may include a piggybacked NAS message, as well as for NAS messages prior to the establishment of SRB2, all using a Dedicated Control Channel (DCCH) logical channel.

SRB2 is for RRC messages which include logged measurement information as well as for NAS messages, all using DCCH logical channel. SRB2 has a lower priority than SRB1, because logged measurement information and NAS messages may be lengthy and may cause the blocking of more urgent and smaller SRB1 messages. SRB2 is always configured by Evolved-UMTS Terrestrial Radio Access Network (E-UTRAN) after security activation.

E-UTRAN supports Dual Connectivity (DC) operation whereby a multiple Reception/Transmission (Rx/Tx) UE in RRC_CONNECTED mode is configured to utilize radio resources provided by two distinct schedulers, located in two eNBs, i.e. radio base stations, connected via a non-ideal backhaul over the X2 interface, see 3GPP 36.300 v. 13.0.0. "Non-ideal backhaul" implies that the transport of messages over the X2 interface between the network nodes may be subject to both packet delays and losses.

eNBs involved in DC for a certain UE may assume two different roles: an eNB may either act as a Master Node (MN), also referred to as Master eNB (MeNB), or as a Secondary Node (SN), also referred to as Secondary eNB (SeNB). In DC a UE is connected to one MN and one SN.

In LTE DC, the radio protocol architecture that a particular bearer uses depends on how the bearer is setup. Three bearer types exist: Master Cell Group (MCG) bearer, Secondary Cell Group (SCG) bearer and split bearers. RRC is located in the MN and SRBs are always configured as MCG bearer type and therefore only use the radio resources of the MN. When a node acts as an SN, the LTE DC solution does not have any UE RRC context of that UE and all such signalling is handled by the MN. FIG. 1 shows a LTE DC User Plane (UP) architecture.

In 3GPP, a study item on a new radio interface for 5G has recently been completed and 3GPP has now continued with the effort to standardize this new radio interface, often abbreviated by New Radio (NR).

LTE-NR DC, also referred to as LTE-NR tight interworking, is currently being discussed for rel-15.

In this context, the major changes from LTE DC are
The introduction of a split bearer from the SN known as SCG split bearer. The SN in this case is also referred to as SgNB, secondary gNB, where gNB denotes an NR base station.
The introduction of split bearers for RRC.
The introduction of a direct RRC from the SN known as SCG-SRB or direct SRB.

FIGS. 2 to 4 show the User Plane (UP) and Control Plane (CP) architectures for LTE-NR tight interworking.

It should be appreciated that embodiments herein apply to different scenarios where the MN and SN nodes can apply various radio interface technologies. The MN node can apply e.g. LTE or NR, and the SN node can also use either LTE or NR without departing from the main concept of embodiments herein. Other technologies could also be used over the radio interface. The 3GPP technical report TR 38.304 v. 0.0.3 includes various scenarios and combinations where the MN and SN are applying either NR, LTE or both.

For the first phase of 5G standardization and 5G deployment, the most likely scenario is that MN will apply LTE, and the SN will apply the new radio interface, denoted NR, currently being under standardization. Thus, we focus on this scenario and use the term MeNB and SgNB for the rest of this description.

The following terminologies are used throughout this text to differentiate different dual connectivity scenarios:
- DC: LTE DC, i.e. both MN and SN employ LTE.
- EN-DC: LTE-NR dual connectivity where LTE is the master and NR is the secondary.
- NE-DC: LTE-NR dual connectivity where NR is the master and LTE is the secondary.
- NR-DC (or NR-NR DC): both MN and SN employ NR.
- Multi-RAT DC (MR-DC): a generic term to describe where the MN and SN employ different radio access technologies (RAT). EN-DC and NE-DC are two different example cases of MR-DC.

As already mentioned above, the DC approach introduced for 5G standardization includes a solution for split bearers for SRBs, see FIGS. 3 and 4. The intent of introducing such "RRC diversity" is to enable e.g. better mobility robustness and improved message delivery between the infrastructure and the UE. For example, it is then possible to send a handover message or any other reconfiguration message over the best link, even if one of either the link or links to the MeNB (or SgNB) has deteriorated significantly. It is also possible to send duplicates of the same message over both MeNB and SgNB to achieve a better success-rate and faster delivery of the concerned message; in case the links are error prone. Such benefits of "RRC diversity" are not available in the current LTE DC solution, and 3GPP has therefore undertaken the challenge to enable such RRC diversity. Having RRC diversity may prove particularly important for ultra-reliable connections with low latency, often called Ultra Reliable Low Latency Communication (URLLC).

As can be seen in FIG. 4, RRC messages generated and/or transmitted from the MN can be sent either via the MeNB, or relayed over an X2 interface to the SgNB. The messages received over the different paths in the UE are then combined to the LTE Packet Data Convergence Protocol (PDCP) and then forwarded to the LTE RRC receiving entity and processed further. In the uplink, the UE generates LTE RRC messages that the UE may transmit either over the NR radio interface towards the SgNB or via the MN node using LTE technology. Messages received in the SgNB are then forwarded over an X2 interface towards the MeNB node.

One of the main reasons behind the introduction of SCG SRB between the UE and SN is that there may be SCG reconfiguration scenarios where SN can configure the UE directly without the need for coordination with the MN. This is for cases such as intra-SN mobility, measurement configurations/reporting related to the intra-SN cells, etc. Intra-SN meaning within SNs. Thus, it has been agreed in 3GPP that SCG SRB will support a (subset) of the functionalities, namely: RRCConnectionReconfiguration, in the DL; and RRCConnectionReconfigurationComplete and MeasurementReport in the UL.

Another control signalling mechanism, in addition to SCG SRB and split SRBs, in LTE-NR tight interworking is using embedded RRC and is also illustrated in FIG. 4. Embedded RRC is employed for two cases:
1. When SCG SRB is not available.
2. The UE has to be configured with settings that affect both the NR and LTE legs, i.e. a co-ordination is required, even if direct SRB is available.

For the first case, the SgNB sends the RRC message to the MeNB via the X2 interface, which the MeNB then embeds in its own RRC message and sends via SRB1, which could be split or not. The UE then extracts the embedded NR RRC message from the container MeNB RRC message and apply the configurations on the NR leg. In the UL direction, the UE embeds the NR RRC messages in an LTE RRC message towards the MeNB, and the MeNB will extract the embedded NR RRC message from this and forwards it to the SgNB.

For the second case, i.e. messages/configurations that require co-ordination between the MeNB and SgNB, e.g. inter (i.e. between different)-RAT measurement configurations, settings affecting buffer sizes which the UE has to allocate to the NR and LTE legs without exceeding the total buffering capability of the UE, etc., the SgNB node can send the NR configurations, the MeNB and SgNB can negotiate the final configurations since it affects the settings of both legs, and the final configuration for the NR leg is sent to the UE via an LTE RRC message that contains the embedded NR RRC message, wherein the final embedded NR RRC message still being generated by the SN.

In LTE, a UE considers a radio link failure (RLF) to be detected when:
i. Upon detecting a certain number of out of sync (OOS) indications from the lower layers associated with a Primary Cell (PCell) within a given time, or
ii. upon random access problem indication from Media Access Control (MAC), or
iii. upon indication from Radio Link Control (RLC) that the maximum number of retransmissions has been reached for an SRB or for a data radio bearer (DRB).

When RLF is detected, the UE prepares an RLF report, which includes, among other information, the measurement status of the serving and neighbour cells at the moment when RLF was detected, goes to IDLE mode, selects a cell following IDLE mode cell selection procedure wherein the selected cell could be the same serving node/cell or another node/cell, and starts the RRC re-establishment procedure, with a cause value set to rlf-cause.

In the case of LTE DC, the RLF detection procedure is similar to what was described above except that for (i), we are concerned only the PCell of the MN, the MAC in (ii) is the MCG MAC entity and the RLC in (iii) is the MCG RLC and the DRB in (iii) corresponds to MCG and MCG-split DRBs.

On the other hand, failure on the secondary side, known as SCGFailure, is detected by:
a) upon detecting radio link failure for the SCG, in accordance with i, ii and iii above, i.e. replace PCell for primary secondary cell (PSCell), MCG MAC for SCG MAC, and MCG/MCG-Split DRB for SCG DRB, or
b) upon SCG change failure, i.e. not able to finalize SCG change within a certain duration after the reception of an RRC connection reconfiguration message instructing the UE to do so, or
c) upon stopping uplink transmission towards the PSCell due to exceeding the maximum uplink transmission timing difference when powerControlMode is configured to 1.

Upon detecting SCGFailure, the UE sends an SCGFailureInformation message towards the MN, which also includes measurement reports, and the MN can either release the SN, change the SN/Cell, or reconfigure the SCG. Thus, a failure on the SCG will not lead to a re-establishment to be performed on the MCG.

3GPP has agreed to adopt the same principles in the context of LTE-NR interworking, i.e. re-establishment in the case of RLF on the master leg and recovery via SCGFailureInformation and SN release/change/modification in case of RLF on the secondary leg. Specifically, it has been agreed:

Upon SgNB Failures, UE Shall:
Suspend all SCG DRBs and suspend SCG transmission for MCG split DRBs, and SCG split DRBs;
Suspend direct SCG SRB and SCG transmission for MCG split SRB;
Reset SCG-MAC;
Send a SCGFailureInformation message to the MeNB with corresponding cause values.

The problem with the existing solution is in the case the SCG failure in the UE occurs at the same time there is an ongoing SCG reconfiguration from the SN. This can result in two types of problems:
1. When should the UE resume the SCG link which is suspended at the detection of SCG failure.
2. What is the last valid UE configuration according to the UE and network.
   If the network and UE does not have an agreement on the last valid UE configuration the network is forced at the next reconfiguration to send the full UE configuration which may be a very large message.
   If the network and UE do have an agreement on the last valid UE configuration the network can at the next reconfiguration use delta signalling, which is in comparison with the valid UE configuration, which is more efficient.

Embodiments herein are related to the case when SCG SRB is not configured and all SN RRC messages are delivered embedded with the MCG SRB, or the case where SCG SRB is configured and the last SCG reconfiguration that was sent to the UE just before SCG failure was sent via embedded RRC, e.g. due to a need for co-ordination with the MCG, or via the SCG SRB.

Consider a situation where the UE has SCG_configuration_version1, and the SN has sent SCG_configuration_version2 via embedded SRB. Furthermore, an SCG failure is detected at the UE, e.g. due to RLF on the PScell, due to max number of RLC retransmissions on an SCG DRB, etc.

Case 1: The MN receives the SCGFailureInformation before it has managed to send the MCG RRC message that embeds the SCG_configuration_version2 to the UE.

Case 2: The MN has started sending the MCG RRC message that embeds the SCG_configuration_version2 to the UE when it receives the SCGFailureInformation, but it has not finalized it yet, e.g. part of the message was still not scheduled, part of the message was being re-transmitted due to lower layer issues)

Case 3: The MN has successfully sent the MCG RRC message that embeds the SCG_configuration_version2 to the UE but while waiting for the complete message for that configuration, an SCG failure was detected in the UE.

Case 3a: while the UE was still applying the SCG_configuration_version2.

Case 3b: the UE has applied the SCG_configuration_version2, and has sent the complete message to the SN embedded with an uplink (UL) message to the MN, but the message has not been received at the MN yet.

Case 3c: same as case 3b, but the MN has received the UL message from the UE, but has not delivered the lower layer acknowledgement (ACK), i.e. the UE still not sure if the message has been delivered to the MN.

In all cases, a situation may arise where the SN and the UE might have different SCG configurations. That is, when the MN tries to get the UE's SCG configuration from the SN, the SN will not be sure to provide SCG_configuration_version1 or SCG_configuration_version2. The SN will not know whether the UE has applied the SCG_configuration_version2 or not as it has not received the complete message.

In case 1, if the MN refrains from forwarding the SCG_configuration_version2, since it knows that the UE has experienced SCG failure, the configuration of the UE will remain SCG_configuration_version1.

On the other hand, if the MN forwards the SCG_configuration_version2 anyways to the UE, the UE will try to apply the configuration. In LTE DC, such a reception of a reconfiguration would have been interpreted by the UE as a response by the network to the SCG failure that it has sent earlier. In this case the UE may decide to resume the SCG link which is typically suspended at SCG failure. But since this message was generated by the SN before the SCG failure was detected/reported, there may not be mobility-ControlInfoSCG (for SCG change) or release indicator (SCG release) meaning it is unlikely that the resume of SCG link would work since UE is still in the same SCG cell. However, if SCG_configuration_version2 was a mobility configuration from the SN, e.g. change of the PScell, then this could also be mistaken by the UE as a response for the SCGFailure Report that has just been sent. The mobility command from the SN might have actually solved the SCG issue, but since the MN is not aware of it, it will try to handle the SCG failure. This might result in:

Unnecessary signalling: If the MN decides to keep the SN, then it may forward the measurement results to the SN, along with an SgNB modification request, for example, or in a separate message, which will probably result in no actual modification from the SN as the SN knows that it has just applied the mobility.

Unnecessary SN change or release: The MN may decide to change the SN, even if the UE has actually successfully recovered the SCG, e.g. changed the PScell. The situation is the same in case the MN decides to release the SN if there was no other SN with a better signal quality.

The situation in case 2 is the same as in Case 1, i.e. the UE has not received the reconfiguration message yet, so all the above consideration for case 1 still applies.

In case 3, regardless of the UE's state (i.e. case 3a, 3b, 3c), it is not completely clear also what the UE behavior will be. But assuming a proper UE implementation, we can assume that the UE will not interrupt the ongoing application of the configuration if SCG failure happens. Thus, cases 3a and 3b are effectively the same. And from the UE's point of view, case 3c is also similar to case 3a and 3b in that it is not sure whether the complete message was received at the MN or not. However, from the network's point of view, case 3b and 3c are different because in case 3c, the network knows the UE has applied the latest configurations. Since both the SCG failure information as well as the complete message are sent via SRB1, even in case 3a/3b, the SCG failure information will be scheduled/sent after the complete message. As such, the network and the UE has the same configuration, e.g. SCG_configuration_version2, but the SN is not yet aware of it since the MN has not forwarded the complete message to the SN yet. and also like in cases 1 and 2, that this latest reconfiguration might have already resolved the SCG failure but the MN is not aware of it and thus will try to resolve a problem that is already taken care of.

The last SCG reconfiguration may be sent via embedded SRB, but also sent via SCG SRB.

Case 4: The SCG_configuration_version2 was sent via the SCG SRB

Case 4a: the UE did not receive the SCG_configuration_version2 due to the SCG failure.

Case 4b: the UE has received the reconfiguration message with the SCG_configuration_version2, but it has not managed to send the complete message for that In case 4, the problem is that the SN node does not know if the UE has applied the SCG_configuration_version2 or not.

In R2-1710622 "Further details on SRB3 handling" by Intel Corporation it was proposed that the UE should include a transaction identity (ID), in the SCG Failure message, of the last RRC SCG configuration that it got prior to the failure. And the MN may include this information when requesting the latest SCG configuration from the SN. In this way, at least the network will know which configuration the UE considers valid at the time of SCG failure. However, there are still issues with this solution:

- The SCGFailure reporting and the forwarding of the embedded SCG_configuration_version2 may happen at the same time, e.g. during a same Transmission Time Interval (TTI). Thus, there is still a chance that the UE will have received the latest configuration but has indicated the previous configuration in the SCG Failure.
- If the embedded SCG_configuration_version2 has not been sent before the SCGFailure report was received at the MN, then the MN may discard this message and request the latest SCG configuration from the SN (indicating the previous transaction ID). This will have the same downside as described above, i.e. the MN trying to handle the problem that is already solved by the SN.
- The solution requires the UE to keep track of SCG configuration transaction IDs even after the configurations has been applied successfully, just in case a failure happens during the next reconfiguration.

Thus, there is still an issue for coordinating which SCG_configuration is used at the UE.

SUMMARY

Certain aspects of the embodiments may provide solutions to one or more of the challenges above or other challenges.

An object herein is to provide a mechanism for efficiently handling communication of a UE being connected to a master node and a secondary node in a wireless communication network.

According to an aspect the object is achieved by providing a method performed by a UE for handling communication in a wireless communication network providing dual connectivity (DC) communication through a master node using a MCG over a first radio interface between the UE and the master node and through a secondary node using a SCG over a second radio interface between the UE and the secondary node. The UE detects a failure associated with the SCG and suspends actions associated with the SCG. The UE performs a reconfiguration of the SCG upon reception of an MCG RRC message comprising SCG configuration, wherein performing the reconfiguration of SCG comprises applying the reconfiguration; and resuming or not resuming the suspended actions associated with the SCG.

According to another aspect the object is achieved by providing a method performed by a master node for handling communication in a wireless communication network, wherein the master node is configured to operate in cooperation with a secondary node to provide DC communication with a user equipment through the master node using a MCG over a first radio interface between the UE and the master node and through the secondary node using a SCG over a second radio interface between the UE and the secondary node. The MN receives from the UE, an indication indicating a failure associated with the SCG. The MN then handles the failure based on whether one or more conditions are fulfilled, and wherein handling the failure comprises performing one or more of: postponing handling of the failure; performing a reconfiguration to the SCG; ignoring the failure; moving the UE to a different secondary node; providing the secondary node with a reconfiguration response message.

According to yet another aspect the object is achieved by providing a method performed by a secondary node for handling communication of a UE in a wireless communication network, wherein the secondary node is configured to operate in cooperation with a master node to provide DC communication with the UE through the secondary node using a SCG over a second radio interface between the UE and the secondary node and the master node using a MCG over a first radio interface between the UE and the master node. The SN transmits to the UE, an SCG reconfiguration message that includes a mobility flag wherein the mobility flag is set to true when the reconfiguration concerns mobility within the secondary node and the mobility flag set to false or not included when the reconfiguration is not concerned with mobility within the secondary node According to still another aspect the object is achieved by providing a UE for handling communication, e.g. handling reconfiguration or performing the reconfiguration, in a wireless communication network providing DC communication through a MN using a MCG over a first radio interface between the UE and the MN and through a secondary node using a SCG over a second radio interface between the UE and the secondary node. The UE is configured to detect a failure associated with the SCG such as a SCG failure, and to suspend actions associated with the SCG. The UE is further configured to perform a reconfiguration of the SCG upon reception of an MCG RRC message comprising SCG configuration, by being configured to apply the reconfiguration; and resume or not resume the suspended actions associated with the SCG.

According to yet still another aspect the object is achieved by providing a master node for handling communication in a wireless communication network, wherein the master node is configured to operate in cooperation with a secondary node to provide DC communication with a UE through the master node using a MCG over a first radio interface between the UE and the master node and through the secondary node using a SCG, over a second radio interface between the UE and the secondary node. The master node is configured to receive from the UE an indication indicating a failure associated with the SCG. The master node is further configured to handle the failure based on whether one or more conditions are fulfilled, and wherein handle the failure comprises performing one or more of: postponing handling of the failure; performing a reconfiguration to the SCG; ignoring the failure; moving the UE to a different secondary node; providing the secondary node with the a reconfiguration response message.

According to another aspect the object is achieved by providing a secondary node for handling communication of a UE in a wireless communication network, wherein the secondary node is configured to operate in cooperation with a master node to provide DC communication with the UE through the secondary node using a SCG over a second radio interface between the UE and the secondary node and the master node using a MCG over a first radio interface between the UE and the master node. The secondary node is configured to transmit to the UE, an SCG reconfiguration message that includes a mobility flag wherein the mobility flag is set to true when the reconfiguration concerns mobility within the secondary node and the mobility flag set to false or not included when the reconfiguration is not concerned with mobility within the secondary node.

Embodiments introduce mechanisms to avoid race conditions and unnecessary reconfigurations during SCG failure recovery in e.g. dual connectivity of different RATs such as EN-DC, where the last SCG reconfiguration message was sent from the SN to the UE e.g. embedded within an MN RRC message or over SCG SRB. This is done by defining specific behavior in the UE for when e.g. the UE should resume the SCG link based on e.g. the presence of mobility information in the SCG configuration or an explicit indication that the SCG link should be resumed.

Additionally, mechanisms are introduced to ensure that the MN node knows if the UE has resumed the SCG link or not. This is done by letting the SN indicate to the MN if an embedded SN RRC message is related to mobility, and in this case, the MN will not try to handle the SCG failure (since the SN mobility information may solve the SCG failure) and cause unnecessary signalling/reconfigurations. Embodiments herein may ensure that the SCG failure conditions are resolved properly in the UE. Embodiments herein may further ensure that the UE and RAN RRC context is synchronized or re-synchronized after failure.

As an addition or an alternative to previous embodiments, the UE may indicate to the MN in a response message to an RRC reconfiguration (containing SCG configuration) if the UE has resumed the SCG link. This enables the MN to ignore the previous SCG failure.

Additionally, mechanisms are introduced making it possible to ensure that the UE has applied the latest SCG reconfiguration that was generated by the SN before the failure was detected by the UE, and also that the complete message is received at the SN. This enables the use of more efficient delta signalling at the next reconfiguration.

Certain embodiments may provide one or more of the following technical advantage(s). Embodiments ensure that SCG failure recovery handling will not result in a race condition, meaning that the behaviour of the wireless communication network is dependent on timing of SCG failure, where the SCG configuration of the UE is different at the target SN and the UE. It also ensures that the MN handles the SCG failure only if necessary, thereby preventing unnecessary signalling and reconfigurations.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
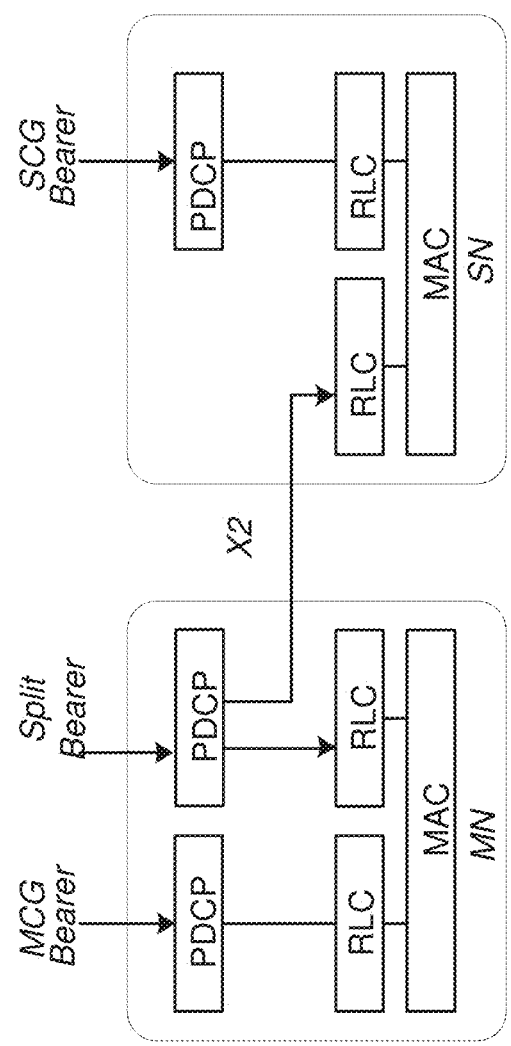
FIG. 1 shows a LTE DC User Plane (UP) architecture.
Figure 2:
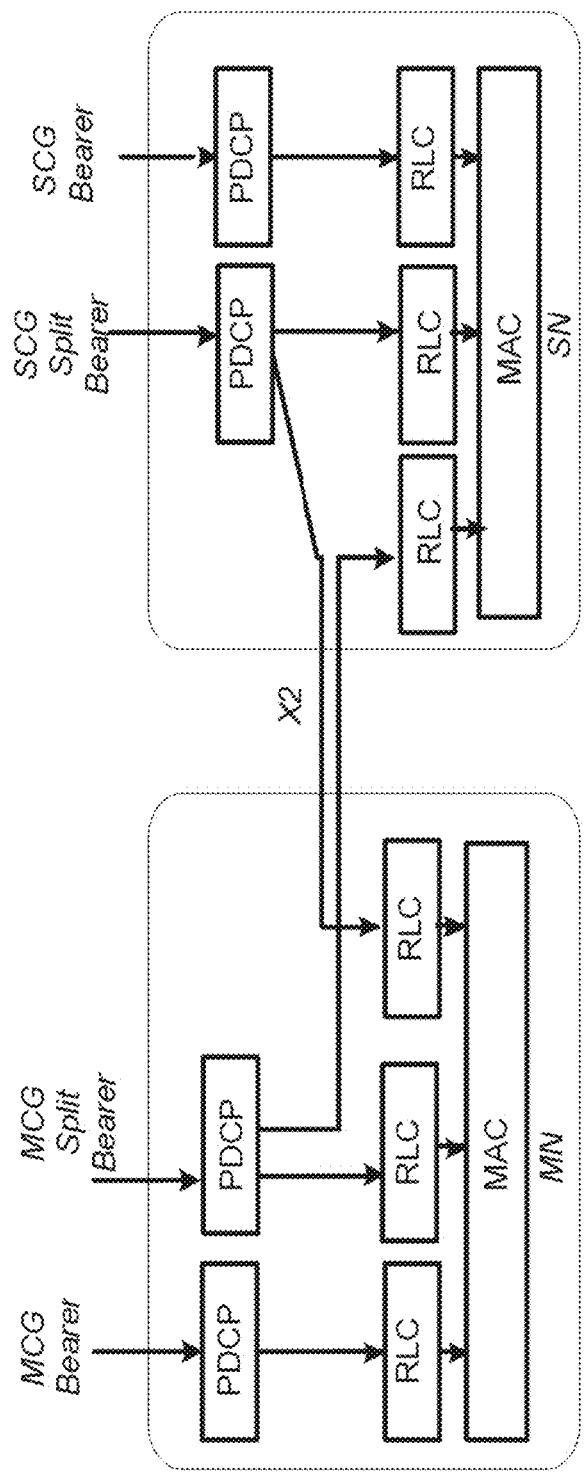
FIG. 2 shows User Plane (UP) and Control Plane (CP) architectures for LTE-NR tight interworking.
Figure 3:
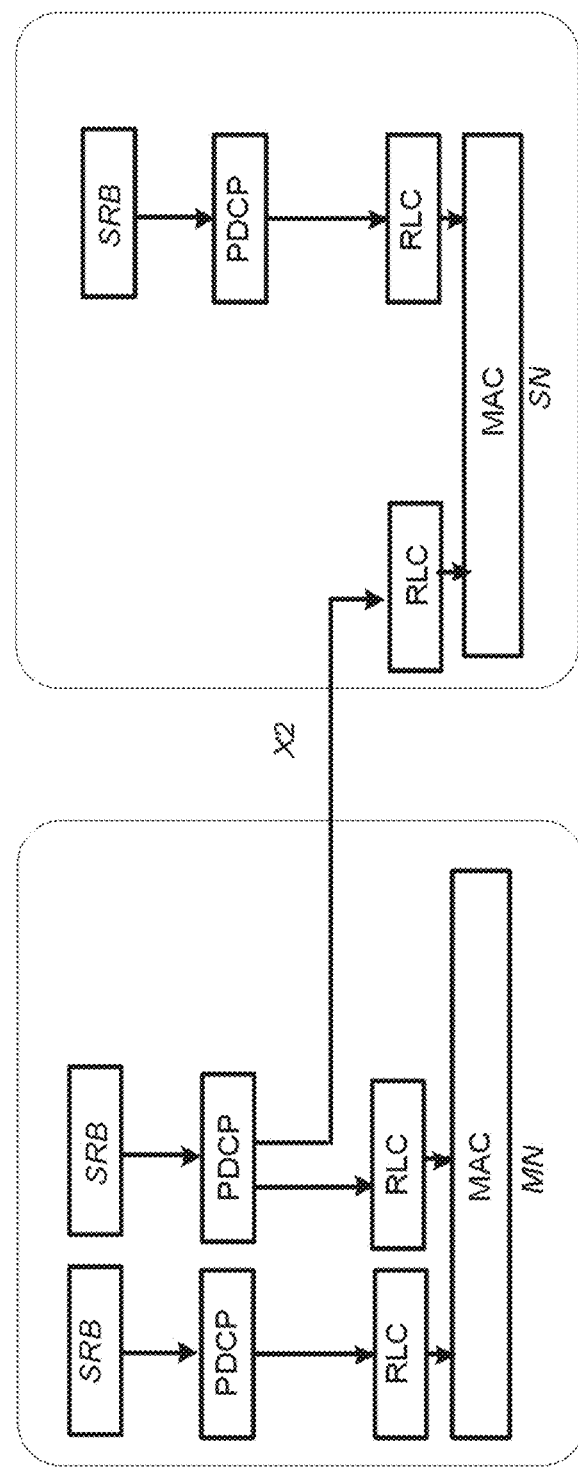
FIG. 3 shows User Plane (UP) and Control Plane (CP) architectures for LTE-NR tight interworking.
Figure 4:
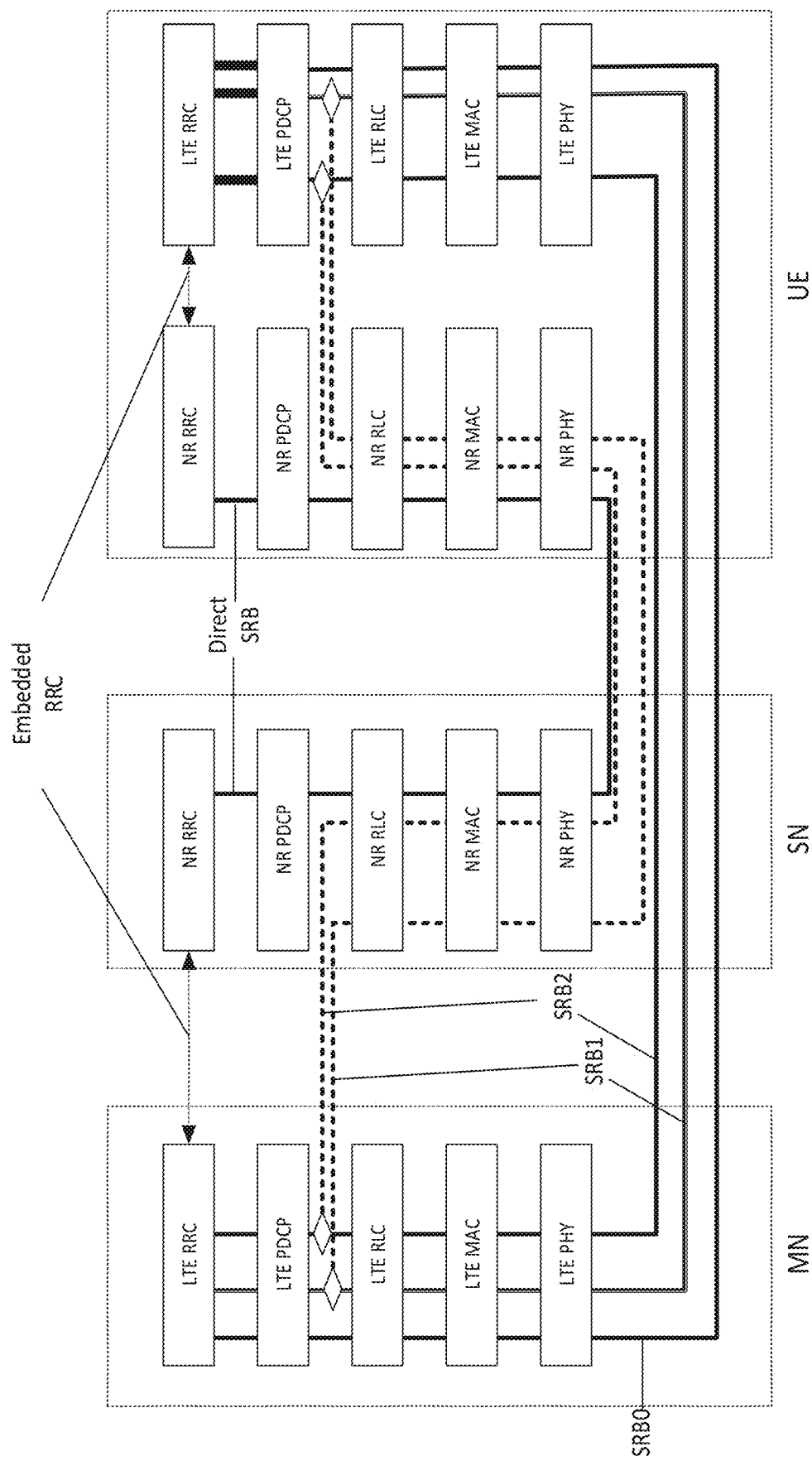
FIG. 4 shows User Plane (UP) and Control Plane (CP) architectures for LTE-NR tight interworking.
Figure 5A:
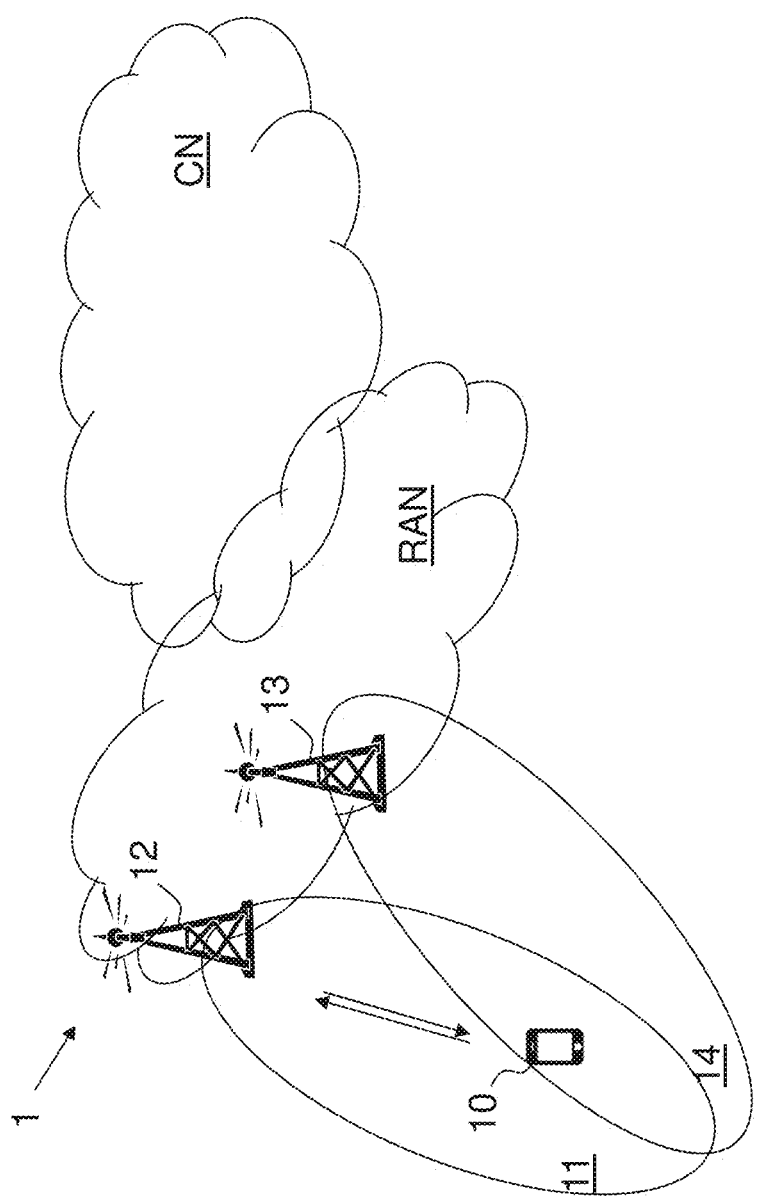
FIG. 5a shows a schematic overview depicting a wireless communication network according to embodiments herein.

Embodiments herein relate to wireless communication networks in general. FIG. 5a is a schematic overview depicting a wireless communication network 1. The wireless communication network 1 comprises one or more Radio Access Networks (RAN) and one or more Core Networks (CN). The wireless communication network 1 may use one or a number of different technologies. Embodiments herein relate to recent technology trends that are of particular interest in a 5G context such as NR, however, embodiments are also applicable in further development of existing wireless communication systems such as e.g. Wideband Code Division Multiple Access (WCDMA) and LTE.

In the wireless communication network 1, wireless devices e.g. a UE 10 such as a mobile station, a station (STA), a non-access point (non-AP) STA, a wireless device and/or a wireless terminal, communicate via one or more Access Networks (AN), e.g. RAN, to one or more core networks (CN). It should be understood by the skilled in the art that "UE" is a non-limiting term which means any terminal, wireless communication terminal, wireless device, Machine Type Communication (MTC) device, Device to Device (D2D) terminal, or node e.g. smart phone, laptop, mobile phone, sensor, relay, mobile tablets or any device capable of communicating using radio communication with a radio network node within an area served by the radio network node.

The wireless communication network 1 provides dual connectivity (DC) through a master node and a secondary node. Thus, the wireless communication network 1 comprises a first radio network node, referred to as a master node (MN) 12, providing radio coverage over a geographical area, a first service area 11, of a first radio access technology (RAT), such as NR, LTE, or similar. The master node 12 may be a transmission and reception point e.g. a radio network node such as a Wireless Local Area Network (WLAN) access point or an Access Point Station (AP STA), an access node, an access controller, a base station, e.g. a radio base station such as a gNodeB (gNB), an evolved Node B (eNB, eNode B), a base transceiver station, a radio remote unit, an Access Point Base Station, a base station router, a transmission arrangement of a radio base station, a stand-alone access point or any other network unit or node capable of communicating with a UE within the area served by the master node 12 depending e.g. on the first radio access technology and terminology used. The MN 12 may be referred to as a master serving node wherein the first service area 11 may be referred to as a serving cell, and the MN 12 communicates with the UE 10 in form of DL transmissions to the UE 10 and UL transmissions from the UE 10.

The wireless communication network 1 further comprises a second radio network node, referred to as a secondary node (SN) 13, providing radio coverage over a geographical area, a second service area 14, of a second radio access technology (RAT), such as LTE, NR, or similar. The first and second RATs may be different RATs. The secondary node 12 may be a transmission and reception point e.g. a radio network node such as a WLAN access point or an AP STA, an access node, an access controller, a base station, e.g. a radio base station such as a gNodeB (gNB), an evolved Node B (eNB, eNode B), a base transceiver station, a radio remote unit, an Access Point Base Station, a base station router, a transmission arrangement of a radio base station, a stand-alone access point or any other network unit or node capable of communicating with a UE within the area served by the secondary node 13 depending e.g. on the second radio access technology and terminology used. The secondary node may be referred to as a secondary serving node wherein the second service area 14 may be referred to as a second serving cell, and the SN 13 communicates with the UE 10 in form of DL transmissions to the UE 10 and UL transmissions from the UE 10.

It should be noted that a service area may be denoted as cell, beam, beam group or similar to define an area of radio coverage.

The UE 10 is configured for communicating with the MN 12 and the SN 13 with a first master configuration of e.g. bearers such as data and/or signalling radio bearers, towards the MN 12 and obtains a first secondary configuration, a first SCG configuration, of e.g. bearers such as signalling and/or data radio bearers, related to the secondary node 13. Related to the secondary node 13 means that the radio interface connection between the UE 10 and the secondary node 13 (or the radio interface associated with the secondary node 13) is used to transfer packets associated with these bearers.

Embodiments herein may be related to the case when SCG SRB is not configured and all SN RRC messages are delivered embedded with the MCG SRB, or the case where SCG SRB is configured and the last SCG reconfiguration that was sent to the UE just before SCG failure was sent via embedded RRC, e.g. due to a need for co-ordination with the MCG, or via the SCG SRB.

Embodiments here are related to transmission of embedded RRC, i.e. a last SCG reconfiguration was (is) sent embedded within, or included with, an MN RRC message to the UE 10. It should further be noted:

Even though embodiments described herein focus on the LTE-NR tight interworking case where the LTE is the master node (referred to as EN-DC), embodiments are also applicable to other DC cases such as NR-LTE DC where NR is the master and LTE is the secondary node (referred to as NE-DC).

LTE and NR are the RATs that are covered in the description herein. However, embodiments herein can be applicable to any aggregation scenario where the MN and SN apply different cellular/wireless RATs, such as Wi-FI, Zigbee, LoRA, Bluetooth, etc.

X2 is referred to as the interface between the MN and SN, based on the interface definitions in LTE. For LTE-NR interworking and NR-NR interworking cases, the exact name for such an interface could end up being different, e.g. Xn instead of X2, with the corresponding XnAP protocol instead of X2AP. However, that will not impact the applicability of embodiments.

Figure 5B:
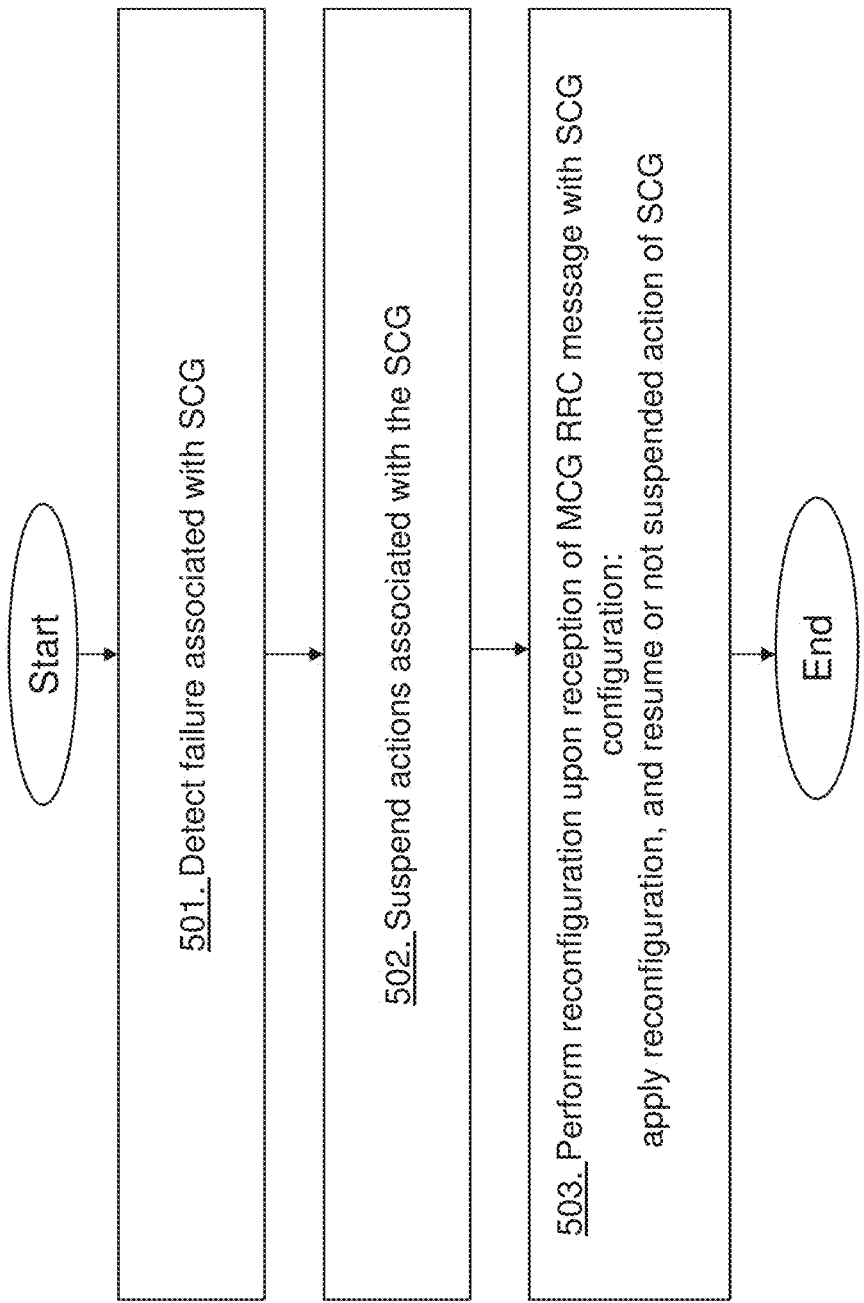
FIG. 5b shows a flowchart depicting a method according to embodiments herein.

The method actions performed by the UE 10 for handling communication, e.g. performing reconfiguration, in the wireless communication network 1 providing DC communication according to embodiments herein will now be described with reference to a flowchart depicted in FIG. 5b. The actions do not have to be taken in the order stated below, but may be taken in any suitable order. Actions performed in some embodiments are marked with dashed boxes. The dual connectivity is provided through the master node 12 using a MCG over a first radio interface between the UE 10 and the master node 12 and through the secondary node 13 using a SCG over a second radio interface between the UE 10 and the secondary node 13. The first radio interface may be using a first radio access technology, e.g. LTE, and the second radio interface may be using a second radio access technology, e.g. NR. The first radio access technology may thus be different from the second radio access technology.

Action 501. The UE 10 detects a failure associated with the SCG, detecting e.g. a transmission error using the SCG, a radio link failure for the SCG, a sync failure of the SCG, a SCG configuration failure, and/or an integrity check failure indication from SCG lower layers. The UE 10 may detect the failure associated with the SCG upon detecting radio link failure for the SCG; upon detecting SCG change failure; or upon exceeding a maximum uplink transmission timing difference.

Action 502. The UE 10 suspends actions associated with the SCG. For example, the UE 10 may: suspend the SCG and SCG split data radio bearers; suspend the SCG SRB, if it was configured; suspend the transmission/reception over the SCG radio, regardless of the destination for the message in the UL direction, i.e. even if it was intended for the MN 12 as in the case of MCG split bearers; and/or suspend the transmission of data or control signalling to the SN 13, e.g. if we have a split SCG bearer, do not use the functioning MN leg to send the data to the SN 13 via the MN 12.

Action 503. The UE 10 handles, e.g. performs, a reconfiguration of the SCG upon reception of an MCG RRC message with SCG configuration, by applying the reconfiguration; and resuming or not resuming the suspended actions associated with the SCG. An MCG RRC message means that it is an RRC message received on a MCG leg. Thus, the RRC message for the SCG may be received embedded within an RRC message from the master node 12. For example, the UE 10 may perform the reconfiguration of the SCG by applying the reconfiguration based on whether the UE 10 has started to transmit a RRC complete message or not. The UE 10 may perform the reconfiguration of the SCG in case the UE 10 has received an NR RRC message embedded within an MN RRC message, after the UE 10 has just detected SCG failure and has suspended the SCG, by applying the reconfiguration Additionally, the UE 10 may perform the reconfiguration of the SCG by sending an RRC complete message in an RRC message for the SCG directly to the secondary node 13 or embedded within an RRC message to the master node 12. E.g. the UE 10 may send an NR RRC complete message embedded within an MN RRC message, upon the successful application of the reconfiguration. In some embodiments the UE 10 may, upon detecting an SCG failure, and the UE 10 has a pending RRC complete message to the last SCG reconfiguration received via SCG SRB, perform the reconfiguration of the SCG by sending the RRC complete message via the MN 12, i.e. embedded via MN RRC message. The UE 10 may further, after sending the complete message via the MN 12, send SCG failure information to the MN 12. The UE 10 may, after sending the complete message via the MN 12, refrain from sending the SCG failure information to the MN 12, when the last SCG message that it has just applied was a mobility message with the SN 13, and it has successfully managed to apply it and resume the SCG. The UE may thus discard the SCG failure information before sending it to the MN 12.

Another example, the UE 10 may perform the reconfiguration of the SCG by resuming the suspended actions associated with the SCG. In some embodiments the UE 10 may perform the reconfiguration of the SCG by resuming any of: a SCG link; a SCG part of a split data radio bearer; a SCG signalling radio bearer, a transmission and/or reception over SCG radio, and/or a transmission of data or control signalling to the secondary node (13). In some embodiments the UE 10 may perform the reconfiguration of the SCG by resuming the suspended SCG link or SCG establishment if the received NR RRC message indicated mobility, or not resuming the suspended SCG link when the received NR RRC message not indicated mobility.

Figure 5C:
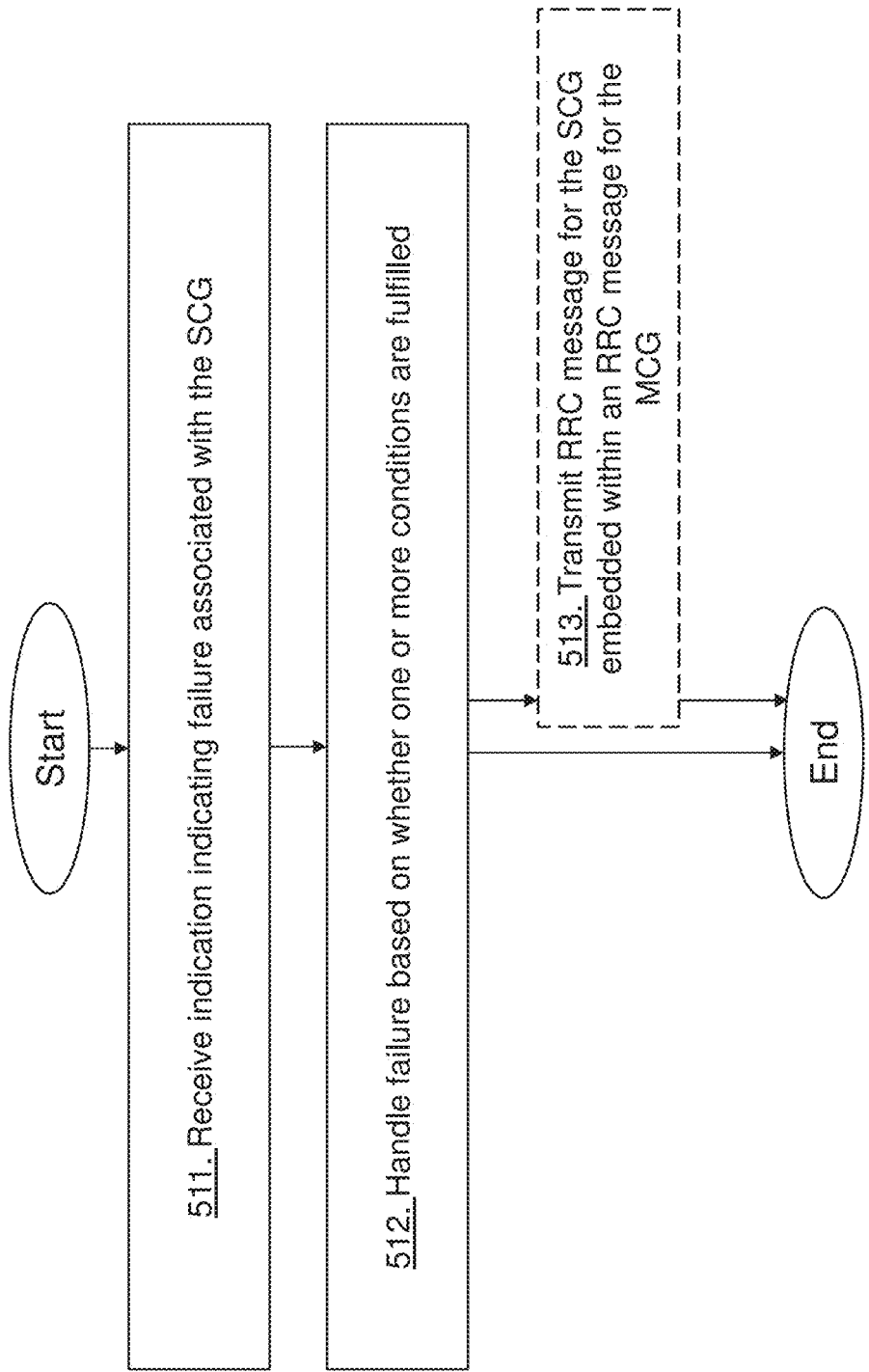
FIG. 5c shows a flowchart depicting a method according to embodiments herein.

The method actions performed by the master node 12 for handling communication in a wireless communication network 1, wherein the master node 12 is configured to operate in cooperation with the secondary node 13 to provide DC communication with the UE 10 through the master node 12 using the MCG, over the first radio interface between the UE 10 and the master node 12 and through the secondary node 13 using the SCG, over the second radio interface between the UE 10 and the secondary node 13, according to embodiments herein will now be described with reference to a flowchart depicted in FIG. 5c. The actions do not have to be taken in the order stated below, but may be taken in any suitable order. Actions performed in some embodiments are marked with dashed boxes. The first radio interface may be using a first radio access technology, e.g. LTE, and the second radio interface may be using a second radio access technology, e.g. NR. The first radio access technology may thus be different from the second radio access technology but may also be the same RAT.

Action 511. The master node 12 receives from the UE 10, an indication indicating a failure associated with the SCG.

Action 512. The master node 12 handles the failure based on whether one or more conditions are fulfilled, and wherein handling the failure comprises performing one or more of: postponing handling of the failure; performing a reconfiguration to the SCG; ignoring the failure; moving the UE 10 to a different secondary node; providing the secondary node 13 with a reconfiguration response message. The one or more conditions may comprise whether the master node 12 has a pending reconfiguration for the UE 10 for the SCG towards the secondary node 13. The one or more conditions may comprise whether a mobility flag is set to true or false in a reconfiguration message, from the secondary node 13. The one or more conditions may comprise whether the master node 12 has started to transmit a reconfiguration message for the SCG before receiving the indication indicating the failure. The one or more conditions may comprise whether the master node 12 has transmitted a reconfiguration message for the SCG and received or not received a reconfiguration response message before receiving the indication indicating the failure. The one or more conditions may comprise whether a last reconfiguration of the SCG was sent directly via the master node (12) or not.

Action 513. The master node 12 may transmit an RRC message for the SCG to the UE 10 embedded within an RRC message for the MCG.

Figure 5D:
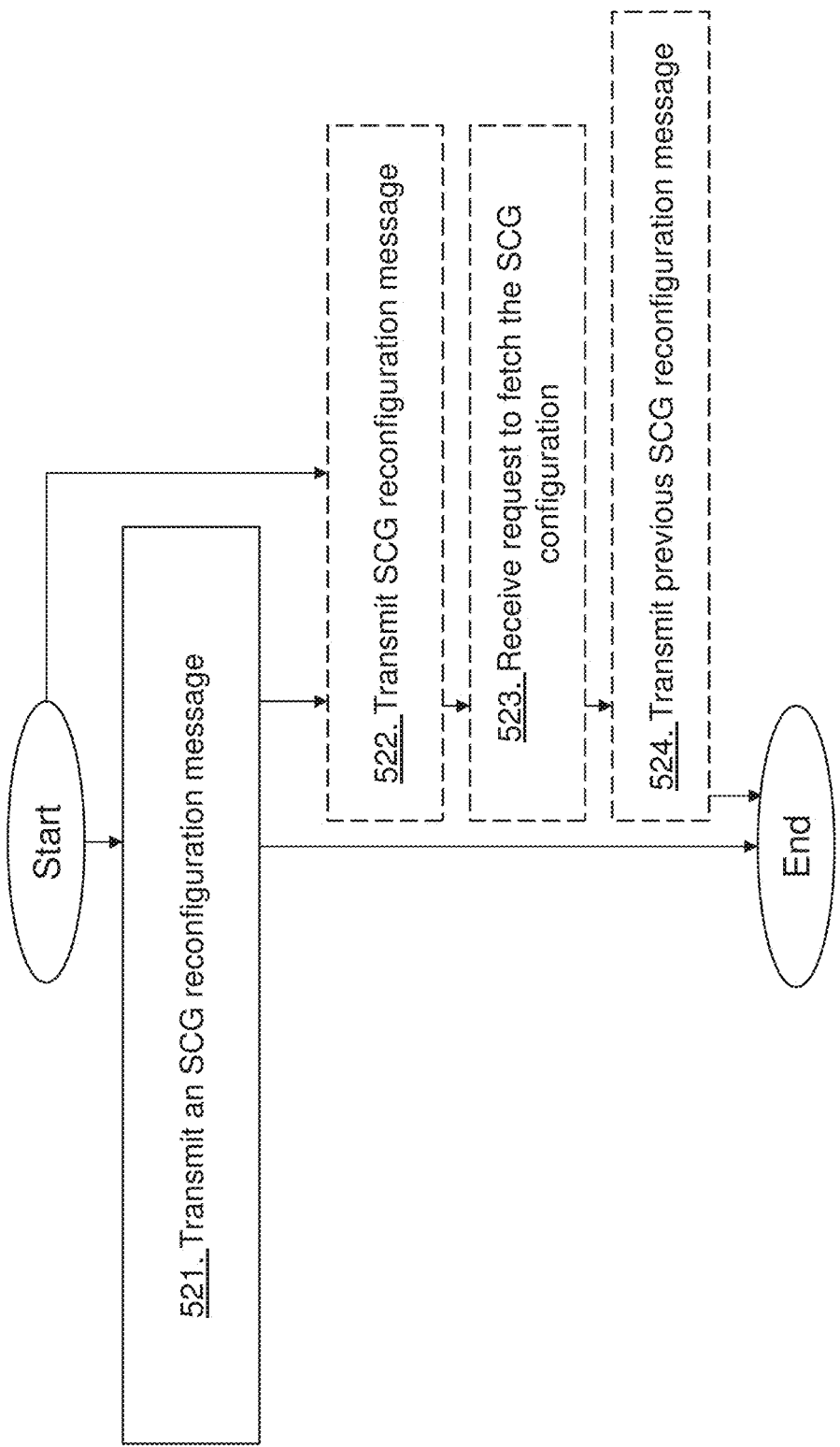
FIG. 5d shows a flowchart depicting a method according to embodiments herein.

The method actions performed by the secondary node 13 for handling communication of the UE 10 in the wireless communication network 1, wherein the secondary node 13 is configured to operate in cooperation with the master node to provide DC communication with the UE 10 through the secondary node 13 using the SCG over the second radio interface between the UE 10 and the secondary node 13 and the master node 12 using the MCG over the first radio interface between the UE 10 and the master node 12, according to embodiments herein will now be described with reference to a flowchart depicted in FIG. 5d. The actions do not have to be taken in the order stated below, but may be taken in any suitable order. Actions performed in some embodiments are marked with dashed boxes. The first radio interface may be using a first radio access technology, e.g. LTE, and the second radio interface may be using a second radio access technology, e.g. NR. The first radio access technology may thus be different from the second radio access technology but may also be the same RAT.

Action 521. The SN 13 transmits to the UE 10, an SCG reconfiguration message that includes a mobility flag wherein the mobility flag is set to true when the reconfiguration concerns mobility within the secondary node and the mobility flag set to false or not included when the reconfiguration is not concerned with mobility within the secondary node.

Action 522. The SN 13 may additionally or alternatively transmit to the UE 10 an SCG reconfiguration message.

Action 523. The SN 13 may additionally receive from the master node 12, a request to fetch the SCG configuration before an RRC complete message corresponding to the SCG reconfiguration has been received.

Action 524. The SN 13 may additionally transmit to the master node 12, a previous SCG configuration message that the UE 10 was configured with before the SCG reconfiguration message was sent.

Figure 6:
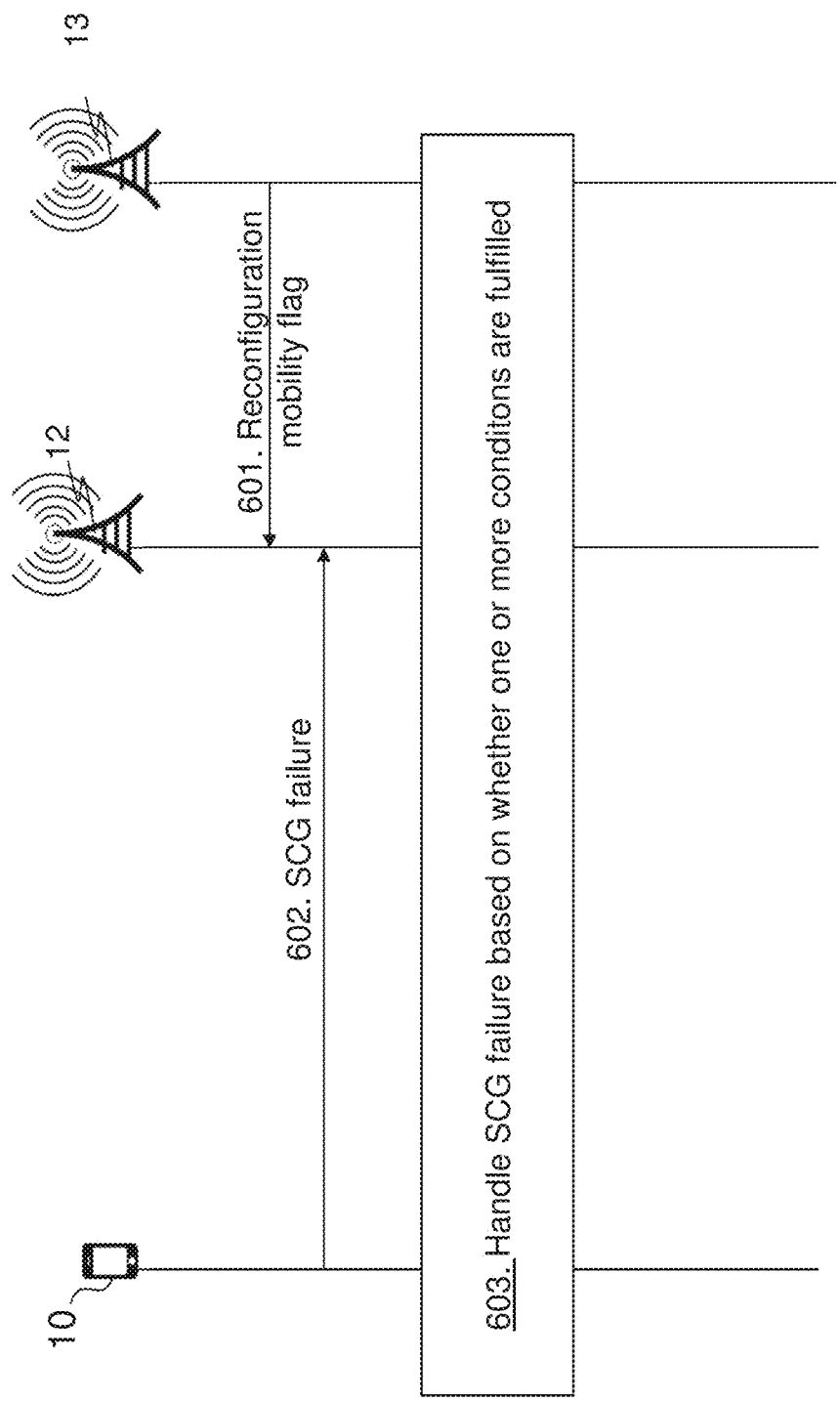
FIG. 6 shows a combined signalling scheme and flowchart according to embodiments herein.

FIG. 6 is a combined signalling scheme and flowchart depicting some embodiments herein.

Action 601. The SN 13 transmits to the MN 12 an indication indicating reconfiguration comprising a mobility flag set to true or false.

Action 602. The UE 10 detects SCG failure e.g. failure of the first configuration for the secondary node and may transmit an indication indicating SCG failure to the master node 12.

Action 603. The master node 12, upon getting the message, handles, e.g. performs, the SCG failure based upon whether one or more conditions are fulfilled. The one or more conditions may comprise: the MN has a pending reconfiguration for the UE of a second secondary configuration of bearers towards the secondary node; a mobility flag is set to TRUE in a reconfiguration message from the SN 13; a mobility flag is set to FALSE in a reconfiguration message from the SN 13; has started to transmit a reconfiguration message, e.g. a message 4, before receiving the SCG failure and a last SCG reconfiguration was sent directly via SCG SRB.

The master node 12 may handle the SCG failure by performing one or more of: postponing handling of the SCG failure; performing a reconfiguration to the second secondary configuration; ignoring the failure; moving the UE to a different SN; providing the SN with a reconfiguration response message, e.g., when postponing the handling of the SCG failure.

Figure 7:
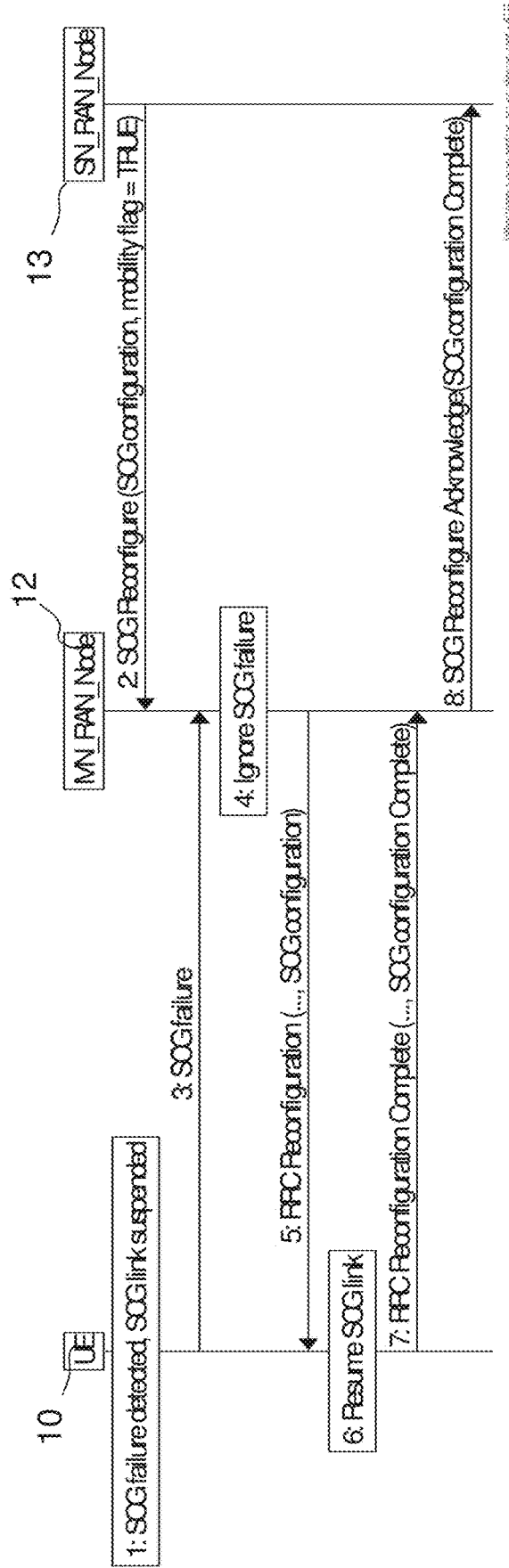
FIG. 7 shows a combined signalling scheme according to embodiments herein.

In the flow in FIG. 7, the MN 12 receives the SCG failure (step 3) when the MN 12 has a pending SCG reconfiguration as indicated with the SCG Reconfigure message received from the SN (step 2). The signalling between the MN and SN node could be over an X2 or Xn or similar network interface. In this case since the mobility flag is set to TRUE, the MN decides to ignore the SCG failure, step 4, since it is likely that the SCG configuration received from the SN node will resolve the failure. For this reason the MN 12 will continue with normal RRC reconfiguration procedure (incl. SCG reconfiguration) step 5-8.

When the UE receives the SCG configuration which in this case contains mobility information for the SCG link, the UE will resume the SCG link. This also resets the SCG link monitoring. In case the resume of the SCG link for some reason would fail the UE will trigger a new SCG failure towards the MN node.

Figure 8:
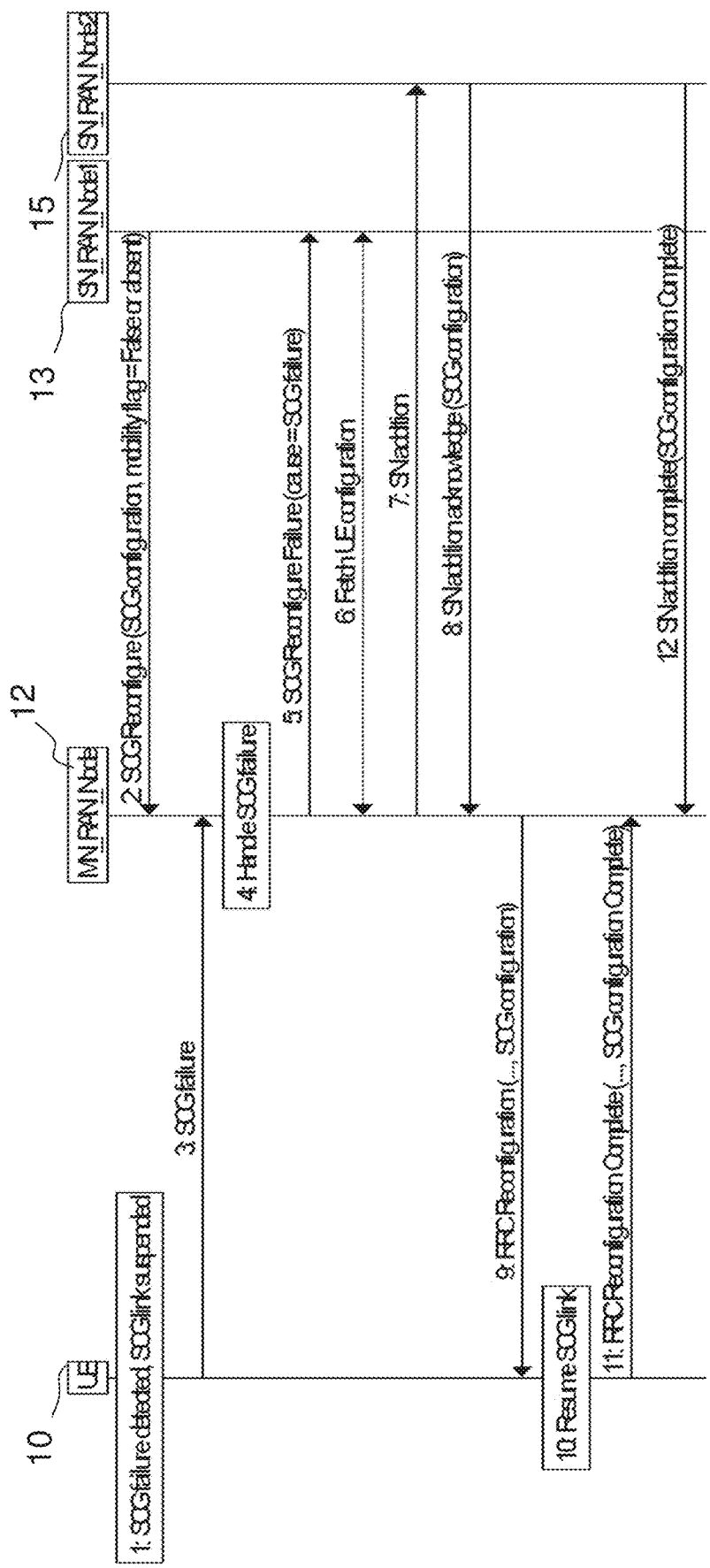
FIG. 8 shows a combined signalling scheme according to embodiments herein.

In the flow in FIG. 8, the MN 12 receives the SCG failure (step 3) when it has a pending SCG reconfiguration as indicated with the SCG Reconfigure message received from the SN 13 (step 2). In this case since the mobility flag is set to False or is absent the MN 12 decides to handle the SCG failure, step 4. In this case it also notifies the old SN node 13 in step 5 about the failure to deliver the SCG configuration to the UE 10. This will mean that the SN 13 will revert to the old SCG configuration which is currently used in the UE 10.

The rest of the flow shows the case the MN 12 decides to handle the SCG failure by moving the UE 10 to a different SN 15. Also, other cases can be considered were the MN 12 decides to keep the UE 10 in the same SN 13 (possible in a different cell). The following optional steps can be performed:

Step 6 the MN 12 fetches the latest valid UE configuration (this step could actually be combined with step 5)

Step 7 the MN 12 performs an SN addition in the new SN 15. The SN addition may contain the last valid UE configuration enabling the target node to perform delta signalling towards the UE 10 (delta signalling is more efficient to "full configuration" since the parameters of the UE configuration that does not need to be changed does not need to be signaled).

Step 8 the new SN node 15 generates an SCG configuration which will be sent to the UE 10 via the MN 12 (in the SN addition acknowledge).

Step 9-12 is a normal UE configuration and SN addition with the difference that when UE 10 receives message 9 the UE 10 will (in step 10) resume the SCG link since the SCG configuration contains SCG mobility information. This also resets the SCG link monitoring. In case the resume of the SCG link for some reason would fail the UE 10 will trigger a new SCG failure towards the MN 12.

Figure 9:
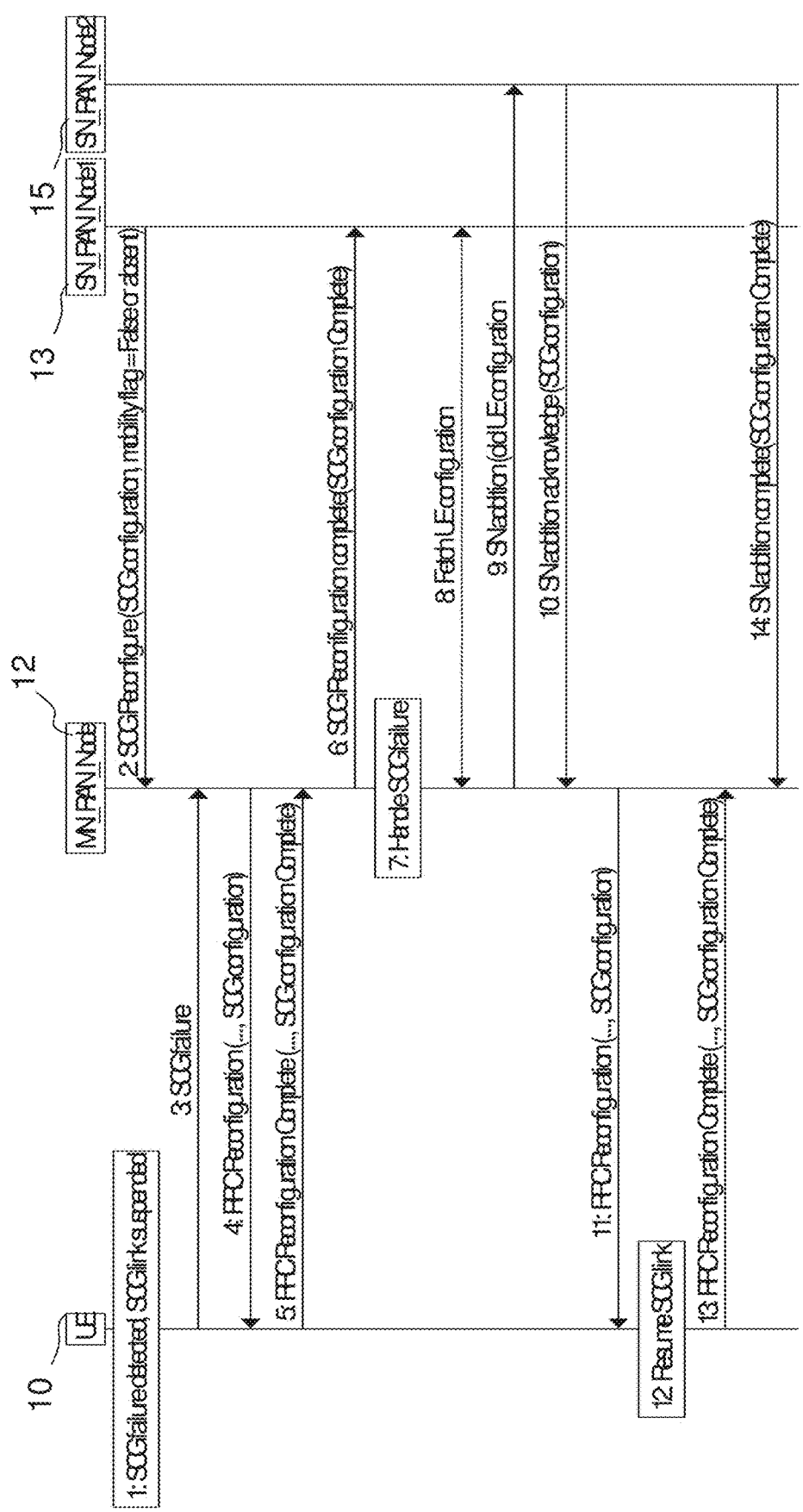
FIG. 9 shows a combined signalling scheme according to embodiments herein.

The flow in FIG. 9 shows another variant of the case the mobility flag is set to False or absent. In this case the MN 12 continues with the SCG reconfiguration as normal (Step 4-6) before the MN 12 handles the SCG failure. This may be useful in the case the MN 12 has started to transmit message 4 before receiving the SCG failure (Step 3). In this case the UE 10 will accept the new SCG reconfiguration but the UE 10 will not resume SCG link, e.g. because the SCG configuration may not contain SCG mobility information. Step 6 could be a new message to let the SN 13 know that the SCG reconfiguration that the SN 13 has last sent has succeeded, or it could be a simple forwarding of the RRC complete message embedded within message 5.

The rest of the flow shows the case the MN 12 decides to handle the SCG failure by moving the UE 10 to the different SN 15. Also, other cases can be considered were the MN 12 decides to keep the UE 10 in the same SN 13 (possible in a different cell). The following optional steps can be performed:

Step 8 the MN 12 fetches the latest valid UE configuration for the UE 10 from the SN 13.

Step 9 the MN 12 performs an SN addition to the different SN 15. The SN addition may contain the last valid UE configuration enabling the target node, i.e. the different SN 15, to perform delta signalling towards the UE 10 (delta signalling is more efficient to "full configuration" since the parameters of the UE configuration that does not need to be changed does not need to be signaled).

Step 10 the different SN 15 generates an SCG configuration which will be sent to the UE 10 via the MN 12 (in the SN addition acknowledge).

Step 11-14 is a normal UE configuration and SN addition with the difference that when UE 10 receives message 11 the UE 10 will (in step 11) resume the SCG link since the SCG configuration contain SCG mobility information. This also restarts the SCG link monitoring. In case the resume of the SCG link for some reason would fail the UE 10 will trigger a new SCG failure towards the MN 12.

Figure 10:
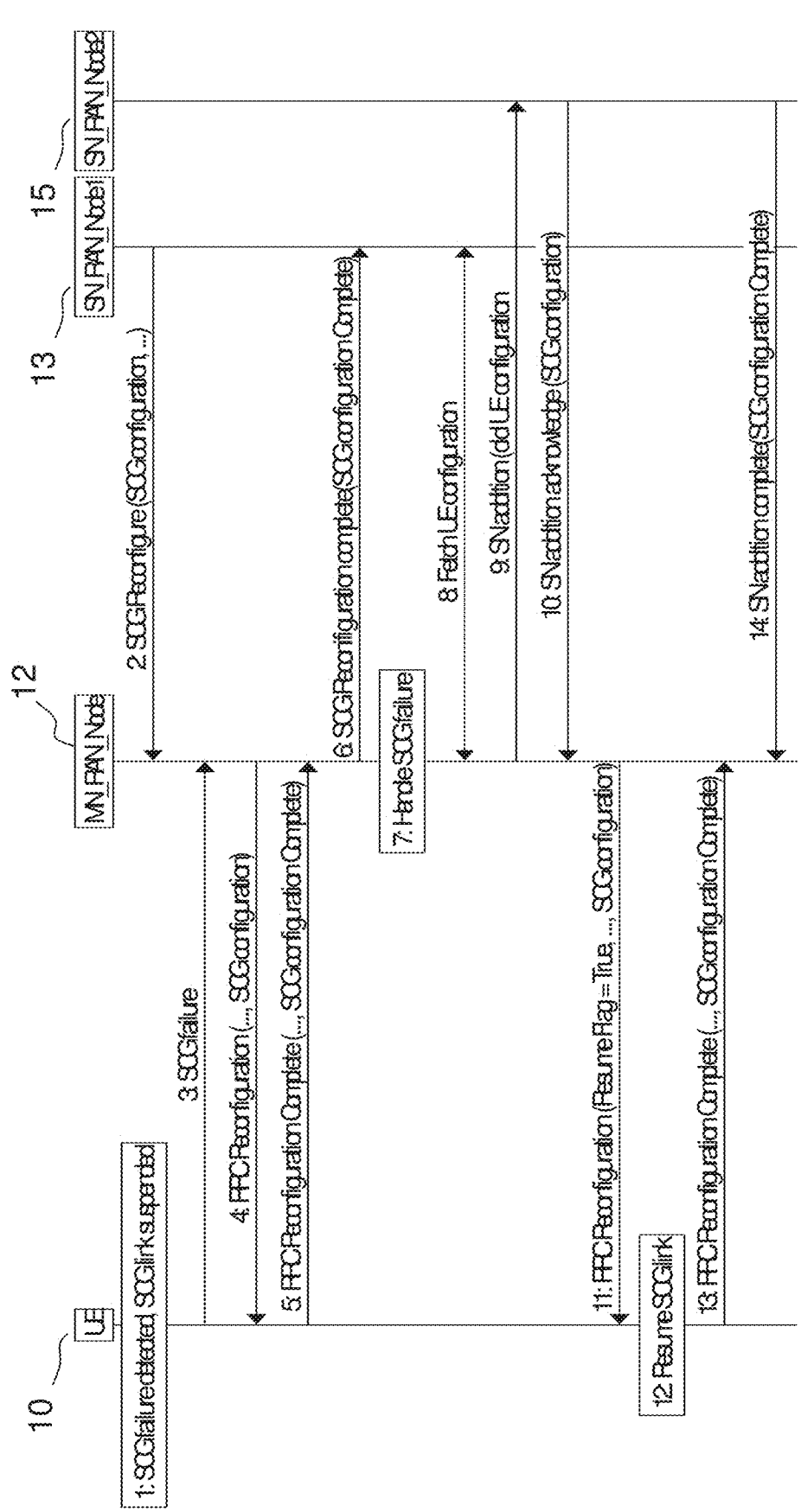
FIG. 10 shows a combined signalling scheme according to embodiments herein.

The flow in FIG. 10 shows another embodiment where the MN 12 does not receive any information about the SCG configuration from the SN 13. In this case the MN 12 continues with the SCG reconfiguration as normal (Step 4-6) before the MN 12 handles the SCG failure. In this embodiment, the UE 10 accepts the new SCG configuration but it does not resume the SCG link until it receives an explicit indication from the MN 12 (step 11).

After step 4-6 the rest of the flow shows the case the MN 12 decides to handle the SCG failure by moving the UE 10 to the different SN 15. Also, other cases can be considered were the MN 12 decides to keep the UE 10 in the same SN 13 (possible in a different cell). The following optional steps can be performed:

Step 8 the MN 12 fetches the latest valid UE configuration

Step 9 the MN 12 performs an SN addition to the different SN 15. The SN addition may contain the last valid UE configuration enabling the different SN 15 to perform delta signalling towards the UE 10 (delta signalling is more efficient to "full configuration" since the parameters of the UE configuration that does not need to be changed does not need to be signaled).

Step 10 the different SN 15 generates an SCG configuration which will be sent to the UE 10 via the MN 12 (in the SN addition acknowledge).

Step 11-14 is a normal UE configuration and SN addition with the difference that when UE 10 receives message 11 the UE 10 may (in step 12) resume the SCG link since MN 12 included a specific indication (e.g. Resume Flag or other) in message 11. This also restarts the SCG link monitoring. In case the resume of the SCG link for some reason would fail the UE 10 will trigger a new SCG failure towards the MN 12.

Figure 11:
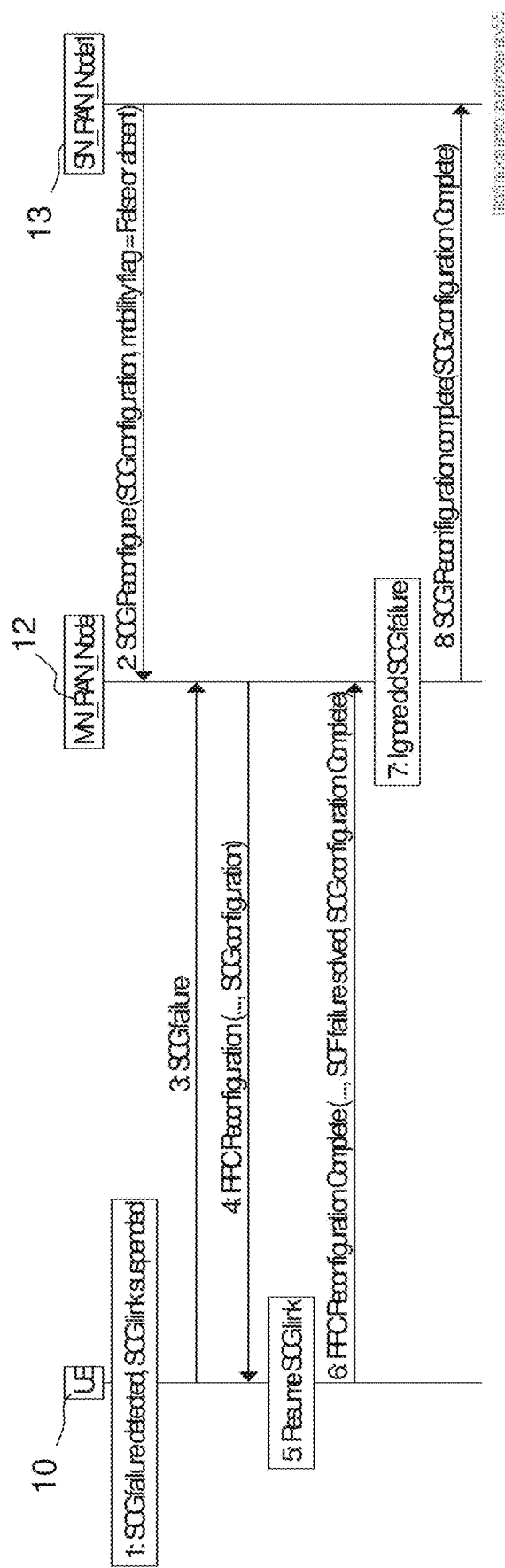
FIG. 11 shows a combined signalling scheme according to embodiments herein.

The flow in FIG. 11 shows another embodiment where the MN 12 does not receive any information about the SCG configuration from the SN 13. In this case the MN 12 continues with the SCG reconfiguration as normal (Step 4-6) before the MN 12 handles the SCG failure. In this embodiment, the UE 10 accepts the new SCG configuration but it does not resume the SCG link until the UE 10 receives an explicit indication from the MN 12 (step 11).

After step 4-6 the rest of the flow shows the case the MN 12 decides to handle the SCG failure by moving the UE 10 to the different SN 15. Also, other cases can be considered were the MN 12 decides to keep the UE 10 in the same SN 13 (possible in a different cell). The following optional steps can be performed:

Step 8 the MN 12 fetches the latest valid UE configuration

Step 9 the MN 12 performs an SN addition to the different SN 15. The SN addition may contain the last valid UE configuration enabling the different SN 15 to perform delta signalling towards the UE 10 (delta signalling is more efficient to "full configuration" since the parameters of the UE configuration that does not need to be changed does not need to be signaled).

Step 10 the different SN 15 generates an SCG configuration which will be sent to the UE 10 via the MN 12 (in the SN addition acknowledge).

Step 11-14 is a normal UE configuration and SN addition with the difference that when UE 10 receives message 11 the UE 10 will (in step 12) resume the SCG link since MN 12 included a specific indication (e.g. Resume Flag or other) in message 11. This also restarts the SCG link monitoring. In case the resume of the SCG link for some reason would fail the UE 10 will trigger a new SCG failure towards the MN 12.

Below are some examples of embodiments disclosed for handling a SCG failure in the wireless communication network 1.

Option 1: a first flag is introduced in an X2 message to indicate if NR message is concerning mobility.

Embodiment 1

The SN 13, upon sending an SCG reconfiguration to the UE 10 that is concerned with mobility within the SN 13 (e.g., SCell addition, PScell change, etc.), includes a flag indicating so.

Embodiment 2

The indication flag according to embodiment 1 may be an optional IE in the X2 RRC Transfer message, a value of TRUE indicating the embedded message is related to mobility and a value of FALSE or the lack of inclusion of the IE indicating the message is not related to mobility.

Embodiment 3

The MN 12, upon receiving an SCG failure information report from the UE 10 and discovering that an NR RRC message is pending to be transmitted to the UE 10 embedded within an MN RRC message, and that the SN 13 has indicated a mobility flag according to embodiment 1, will ignore the SCG failure information report, and instead forward the pending NR RRC message to the UE 10.

Embodiment 4

The MN 12, upon receiving an SCG failure information report from the UE 10 and the MN 12 has initiated transmission to the UE 10 or just successfully sent to the UE 10 an NR RRC message embedded within an MN RRC message, and that the SN 13 has indicated a mobility flag according to embodiment 1 when transferring this message to the MN 12, and it has not yet received an RRC complete message regarding this message, will ignore the SCG failure information report.

Embodiment 5

An embodiment according to embodiments 3 or 4, where the MN 12, upon receiving an RRC complete message to the last NR RRC message sent embedded within an MN RRC message, forwards the complete message to the SN 13.

Embodiment 6

The MN 12, upon receiving an SCG failure information report from the UE 10 and discovering that an NR RRC message is pending to be transmitted to the UE 10 embedded within an MN RRC message, and that the SN 13 has not indicated a mobility flag according to embodiment 1, postpones the handling of the SCG failure information report and instead forwards the pending NR RRC message embedded within an MN RRC message.

Embodiment 7

The MN 12, upon receiving an SCG failure information report from the UE 10 and the MN 12 has initiated transmission to the UE 10 or just successfully sent to the UE 10 an NR RRC message embedded within an MN RRC message, and that the SN 13 has not indicated a mobility flag according to embodiment 1 when transferring this message to the MN 12, and the MN 12 has not yet received an RRC complete message regarding this message, postpones the handling of the SCG failure information report.

Embodiment 8

An embodiment according to embodiments 6 or 7, where the MN 12, upon receiving an RRC complete message to the last NR RRC message sent embedded within an MN RRC message, forwards the complete message to the SN 13.

Embodiment 9

An embodiment according to embodiment 8, where the MN 12 decides to change to a second SN, and requests the current SN 13 the latest SCG configurations, releases the SN 13 and adds another SN, indicating the latest SCG reconfiguration received from the SN 13 that it just released, so that the new SN can apply delta configuration.

Embodiment 10

The MN 12, upon receiving an SCG failure information report from the UE 10 and discovering that an NR RRC message is pending to be transmitted to the UE 10 embedded within an MN RRC message, and that the SN 13 has not indicated a mobility flag according to embodiment 1, discards the pending RRC message, request the current SN 13 the latest SCG configuration with a "previous" flag indicating to the SN 13 to send it the latest configuration acknowledged by the UE 10, releases the SN 13 and adds another SN, indicating the SCG configuration received from the SN 13 that it just released, so that the new SN can apply the delta configuration.

Embodiment 11

An embodiment according to embodiment 9 or 10, where the MN 12 forwards the SCG reconfiguration message to the UE 10 embedded within an MN RRC message.

Option 2: no flag is introduced in an X2 message to indicate if NR message is concerning mobility, instead is an explicit resume indication introduced and transmitted from the MN 12

Embodiment 12

The MN 12, upon receiving an SCG failure information report from the UE 10 and discovering that an NR RRC message is pending to be transmitted to the UE 10 embedded within an MN RRC message, postpones the handling of the SCG failure information report and instead forwards the pending NR RRC message embedded within an MN RRC message.

Embodiment 13

The MN 12, upon receiving an SCG failure information report from the UE 10 and the MN 12 has initiated transmission to the UE 10 or just successfully sent to the UE 10 an NR RRC message embedded within an MN RRC message, and the MN 12 has not yet received an RRC complete message regarding this message, postpones the handling of the SCG failure information report.

Embodiment 14

An embodiment according to embodiments 12 or 13, where the MN 12, upon receiving an RRC complete message to the last NR RRC message sent embedded within an MN RRC message, forwards the complete message to the SN 13.

Embodiment 15

An embodiment according to embodiment 14, where the MN 12 decides to change the SN 13, and requests the current SN 13 the latest SCG configurations, releases the SN 13 and adds another SN, indicating the latest SCG reconfiguration received from the SN 13 that it just released, so that the new SN can apply delta configuration.

Embodiment 16

The MN 12, upon receiving an SCG failure information report from the UE 10 and discovering that an NR RRC message is pending to be transmitted to the UE 10 embedded within an MN RRC message, discards the pending RRC message, request the current SN 13 the latest SCG configuration with a "previous" flag indicating to the SN 13 to send it the latest configuration acknowledged by the UE 10, releases the SN 13 and adds another SN, indicating the SCG configuration received from the SN 13 that it just released, so that the new SN can apply the delta configuration.

Embodiment 17

An embodiment according to embodiment 15 or 16, where the MN 12 forwards the SCG reconfiguration message to the UE 10 embedded within an MN RRC message, and includes a resume flag in the MN part of the message to indicate to the UE 10 that it can resume the suspended SCG.

Embodiment 18

The MN 12, upon receiving an SCG failure information report from the UE 10, discards any pending NR RRC messages, releases the SN 13, putting the UE 10 out of dual connectivity. This may be performed both in option 1 and for option 2 above.

UE embodiments:
Applicable to both options mentioned above

Embodiment 19

The UE 10, where upon reception of an NR RRC message embedded within an MN RRC message, after it has just detected SCG failure and has suspended the SCG, will apply the reconfiguration.

Embodiment 20

The UE 10 sends the NR RRC complete message embedded within an MN RRC message, upon the successful application of the configuration.

Applicable to option 1 wherein the first flag is introduced in X2 to indicate if NR message is concerning mobility:

Embodiment 21

An embodiment according to embodiment 19, whereby if the received NR RRC message indicated mobility, the UE 10 will resume the suspended SCG link or SCG establishment.

Embodiment 22

An embodiment according to embodiment 19, whereby if the received NR RRC message not indicated mobility, the UE 10 will not resume the suspended SCG link.

Applicable to option 2 wherein no flag is introduced in X2 message to indicate if NR message is concerning mobility:

Embodiment 23

An embodiment according to embodiment 19, whereby the UE 10 resumes the suspended SCG link only if the MN RRC message indicates an explicit resume flag.

Embodiment 24

An embodiment according to embodiment 19, whereby if the received NR RRC message not including an explicit resume flag, the UE 10 will not resume the suspended SCG link.

Applicable to both options above.

Embodiment 25

An embodiment according to embodiment 21 or 23, whereby the UE 10 indicates to the MN or the SN in the LTE or NR RRC complete message that it has resumed the suspended SCG link.

Embodiments related to SCG SRB, i.e. last SCG reconfiguration was (being) sent directly via SCG SRB.

UE Part:

Embodiment 26

The UE 10 upon detecting an SCG failure, and it has a pending RRC complete message to the last SCG reconfiguration received via SCG SRB, will send the RRC complete message via the MN 12 (i.e. embedded via MN RRC message).

Embodiment 27

The UE 10, after sending the complete message via the MN according to embodiment 26, sends the SCG failure information to the MN 12.

Embodiment 28

The UE 10, after sending the complete message via the MN, refrains sending the SCG failure information to the MN 12 according to embodiment 26, if the last SCG message that it has just applied was a mobility message with the SN 13, and it has successfully managed to apply it and resume the SCG, will discard the SCG failure information before sending it to the MN 12.

Network Part:

Embodiment 29

The SN 13, upon getting a request to fetch an SCG configuration from the SN 13, if it has been waiting for a complete message to the last SCG reconfiguration that the SN 13 has sent via SCG SRB, will respond to the MN 12 with the previous SCG configuration (i.e. the last SCG reconfiguration that the SN 13 has received a complete message to).

Embodiment 30

The SN 13, upon getting a request to fetch an SCG configuration from the SN 13, if the SN 13 has been waiting for a complete message to the last SCG reconfiguration that the SN 13 has sent via SCG SRB, will respond to the MN 12 with an empty message (e.g. an empty SCG configuration) optionally indicating that it does not have a valid configuration.

Embodiment 31

The MN 12, upon getting an empty SCG configuration according to embodiment 30, considers delta configuration is not applicable, and thus will not include SCG configuration in the SN addition request message that it sends to a target SN, if it decides to change the SN (i.e. only full configuration is applicable).

Figure 12:
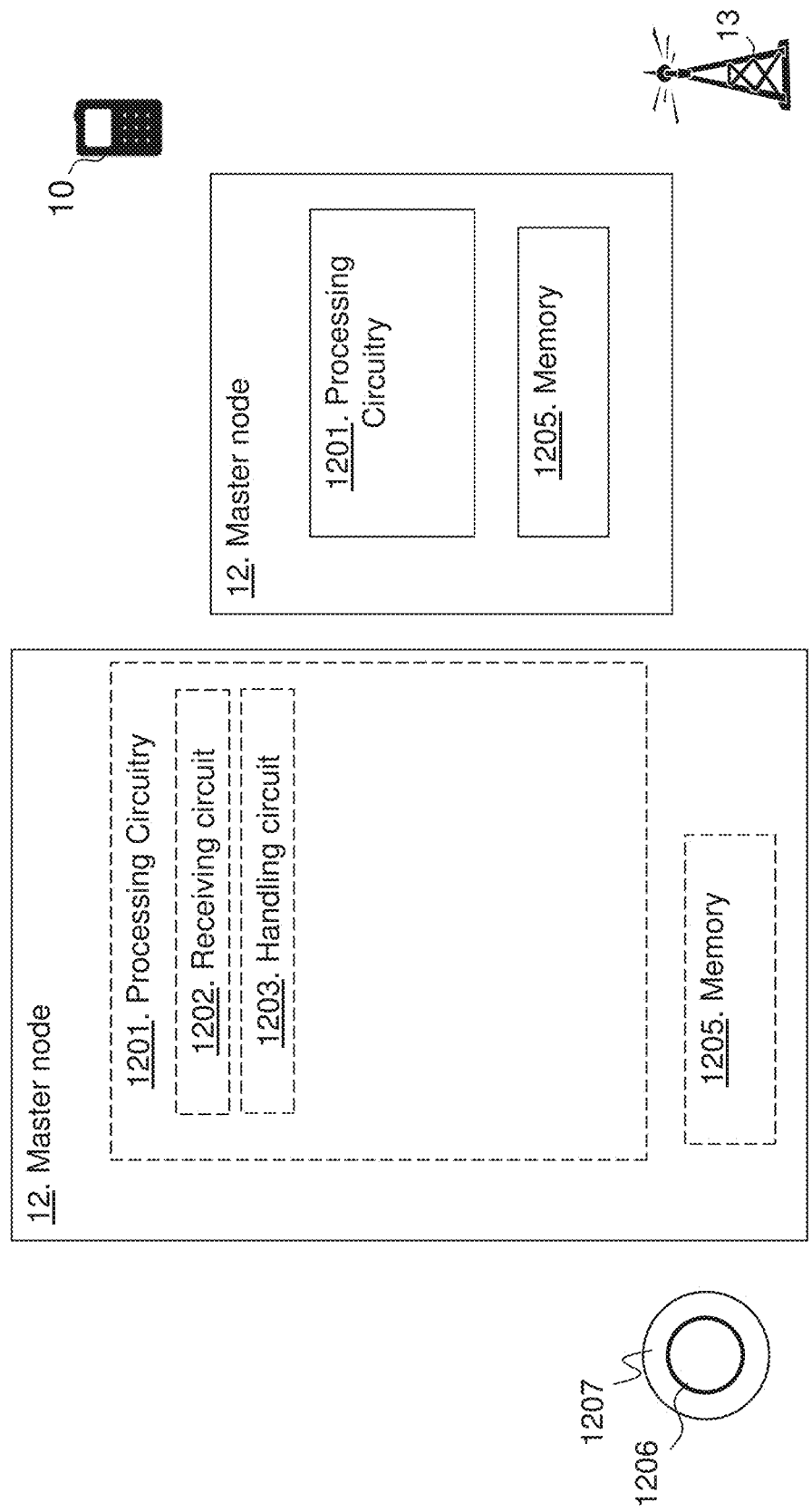
FIG. 12 shows a block diagram depicting a MN according to embodiments herein.

FIG. 12 is a block diagram depicting a first radio network node such as the master node 12 for handling communication in a wireless communication network, wherein the master node 12 is configured to operate in cooperation with a secondary node to provide DC communication with the UE 10 through the master node 12 using the MCG over the first radio interface between the UE 10 and the master node 12 and through the secondary node 13 using the SCG over the second radio interface between the UE 10 and the secondary node 13. The first radio interface may be using a first radio access technology and the second radio interface may be using a second radio access technology, and wherein the first radio access technology is different from the second radio access technology.

The master node and the secondary node are configured for communicating with the UE 10. The master node may be configured with the first master configuration of bearers, e.g. signalling and/or data radio bearers, towards the UE 10 and the UE 10 has obtained the first secondary configuration of bearers, e.g. signalling or data radio bearers, related to the secondary node 13. I.e. the MN 12 may be configured with a MCG link to the UE 10 and the UE 10 may be configured for a SCG link to the SN 13 e.g. UE has been configured with a secondary radio interface configuration associated with the secondary node. The master node 12 may comprise processing circuitry 1201, e.g. one or more processors, configured to perform the methods herein. The MN 12 and/or the processing circuitry 1201 may be configured to transmit the RRC message for the SCG to the UE 10 embedded within an RRC message for the MCG.

The master node 12 may comprise a receiving circuit 1202, e.g. a receiver or a transceiver. The master node 12, the processing circuitry 1201, and/or the receiving circuit 1202 is configured to receive from the UE 10, the indication indicating the failure associated with the SCG e.g. receive an indication indicating failure of the first secondary configuration.

The master node 12 may comprise a handling circuit 1203. The master node 12, the processing circuitry 1201, and/or the handling circuit 1203 is configured to handle the failure based on whether one or more conditions are fulfilled, and wherein handle the failure comprises performing one or more of: postponing handling of the failure; performing a reconfiguration to the SCG; ignoring the failure; moving the UE 10 to a different secondary node; providing the secondary node 13 with the a reconfiguration response message. The one or more conditions may comprise whether the master node 12 has a pending reconfiguration for the UE 10 for the SCG towards the secondary node. The one or more conditions may comprise whether a mobility flag is set to true or false in a reconfiguration message, from the secondary node 13. The one or more conditions may comprise whether the master node 12 has started to transmit a reconfiguration message for the SCG before receiving the indication indicating the failure. The one or more conditions may comprise whether the master node 12 has transmitted a reconfiguration message for the SCG and received or not received a reconfiguration response message before receiving the indication indicating the failure. The one or more conditions may comprise whether a last reconfiguration of the SCG was sent directly via the master node 12 or not.

E.g. to handle the SCG failure based on whether one or more conditions are fulfilled wherein the one or more conditions may comprise: the MN 12 has a pending SCG reconfiguration; a mobility flag is set to TRUE in a reconfiguration message from the SN 13; a mobility flag is set to FALSE in a reconfiguration message from the SN 13; has started to transmit a reconfiguration message before receiving the SCG failure, and a last SCG reconfiguration was sent directly via SCG SRB. The master node may handle the SCG failure by performing one or more of: postponing handling of the SCG failure; performing a reconfiguration to the second secondary configuration; ignoring the failure; moving the UE to a different SN; providing the SN with a reconfiguration response message, e.g. when postponing the handling of the SCG failure.

The MN 12 further comprises a memory 1205. The memory comprises one or more units to be used to store data on, such as signal strengths or qualities, ID of UEs, IDs of radio network nodes, MSG configurations; SCG configurations, flags, applications to perform the methods disclosed herein when being executed, and similar.

The methods according to the embodiments described herein for the MN 12 are respectively implemented by means of e.g. a computer program 1206 or a computer program product, comprising instructions, i.e., software code portions, which, when executed on at least one processor, cause the at least one processor to carry out the actions described herein, as performed by the MN 12. The computer program 1206 may be stored on a computer-readable storage medium 1207, e.g. a disc, a USB stick or similar. The computer-readable storage medium 1207, having stored there on the computer program, may comprise the instructions which, when executed on at least one processor, cause the at least one processor to carry out the actions described herein, as performed by the MN 12. In some embodiments, the computer-readable storage medium may be a transitory or a non-transitory computer-readable storage medium.

Figure 13:
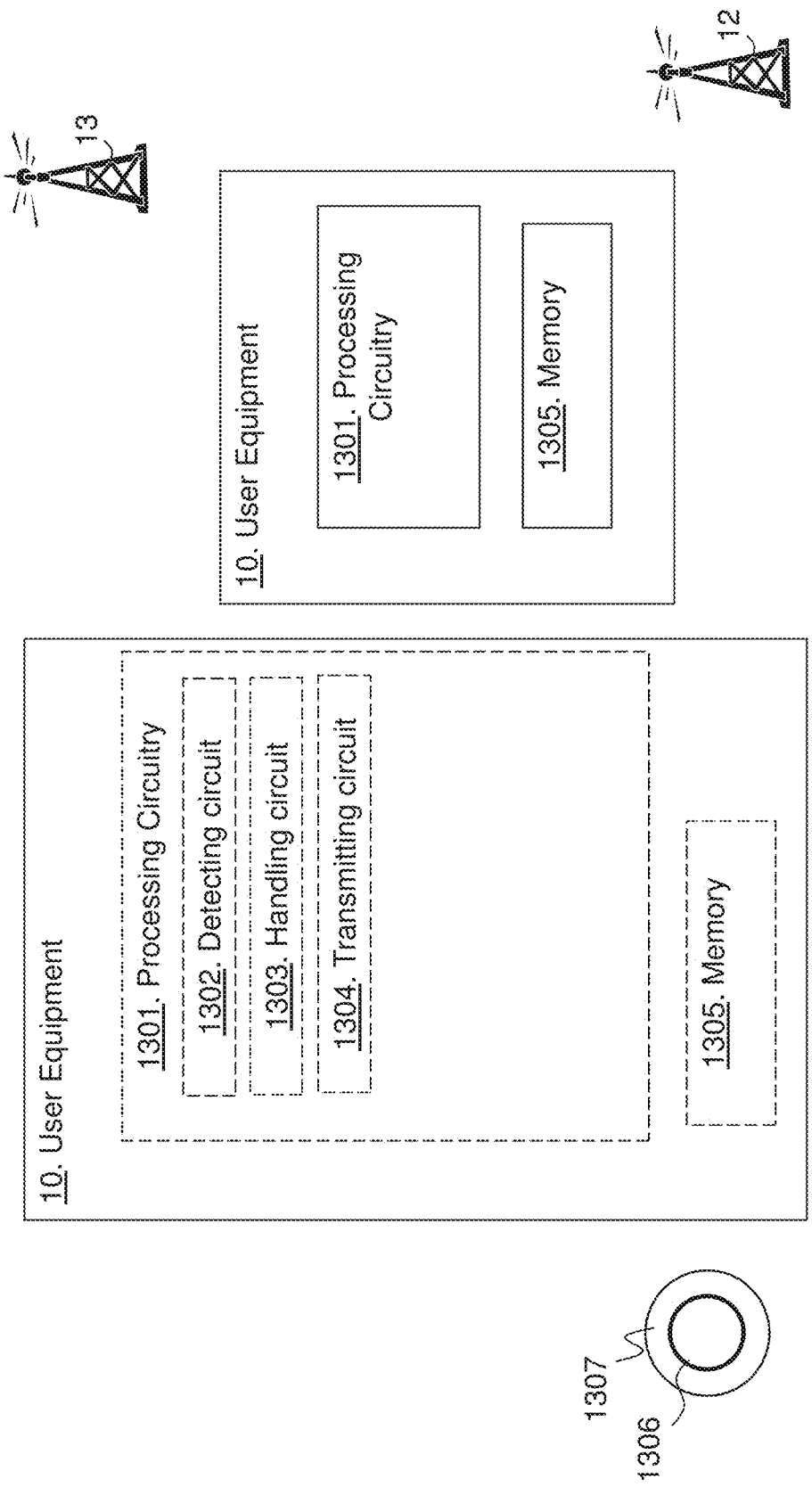
FIG. 13 shows a block diagram depicting a UE according to embodiments herein.

FIG. 13 is a block diagram depicting the user equipment 10 for handling communication in a wireless communication network providing DC communication through the MN 12 using the MCG over the first radio interface between the UE and the MN 12 and through the SN 13 using the SCG over the second radio interface between the UE 10 and the secondary node 13. The UE may be configured for communicating with a master node and a secondary node with a first master configuration of bearers towards the master node and a first secondary configuration of bearers towards the secondary node. The UE 10 may receive, at least partly, a reconfiguration indication indicating a second secondary configuration of bearers, i.e. SCG link, towards the secondary node. The first radio interface may be using a first radio access technology and the second radio interface may be using a second radio access technology, wherein the first radio access technology is different from the second radio access technology.

The UE 10 may comprise processing circuitry 1301, e.g. one or more processors, configured to perform the methods herein.

The UE 10 may comprise a detecting circuit 1302, e.g. a transmitter or a transceiver. The UE 10, the processing circuitry 1301, and/or the detecting circuit 1302 is configured to detect the failure associated with the SCG such as a SCG failure.

The UE 10 may comprise a transmitting circuit 1304, e.g. a transmitter or a transceiver. The UE 10, the processing circuitry 1301, and/or the transmitting circuit 1304 may be configured to transmit the indication indicating failure of the first secondary configuration.

The UE 10 may comprise a handling circuit 1303. The UE, the processing circuitry 1301, and/or the handling circuit 1304 is configured to suspend actions associated with the SCG, e.g. suspend SCG link; SCG split data radio bearer; SCG signalling radio bearer, transmission and/or reception over SCG radio, and/or transmission of data or control signalling to the secondary node 13. The UE, the processing circuitry 1301, and/or the handling circuit 1303 is configured to handle, e.g. perform, the reconfiguration of the SCG upon reception of the MCG RRC message comprising SCG configuration, by being configured to apply the reconfiguration; and resume or not resume the suspended actions associated with the SCG. The MCG RRC message for the SCG may be received embedded within the RRC message from the MN 12. The UE, the processing circuitry 1301, and/or the handling circuit 1303 may be configured to perform the failure of the first secondary configuration, denoted SCG failure, based on whether one or more conditions are fulfilled.

The UE, the processing circuitry 1301, and/or the handling circuit 1303 may be configured to perform the reconfiguration of SCG by applying the reconfiguration based on whether the UE 10 has started to transmit a RRC complete message or not.

The UE, the processing circuitry 1301, and/or the handling circuit 1303 may be configured to perform the reconfiguration of the SCG by being configured to send an RRC complete message in an RRC message for the SCG directly to the secondary node 13 or embedded within an RRC message to the master node 12.

The UE, the processing circuitry 1301, and/or the handling circuit 1303 may be configured to perform the reconfiguration of SCG by being configured to resume the suspended actions associated with the SCG by resuming any of: the SCG link; the SCG part of the split data radio bearer; the SCG signalling radio bearer; the transmission and/or reception over SCG radio, and/or the transmission of data or control signalling to the secondary node (13).

The UE, the processing circuitry 1301, and/or the handling circuit 1303 may be configured to, upon reception of an RRC message embedded within an MN RRC message, after it has just detected SCG failure and has suspended the SCG link, apply the reconfiguration.

The UE, the processing circuitry 1301, and/or the handling circuit 1303 may be configured to send the RRC complete message embedded within an MN RRC message, upon the successful application of the configuration.

The UE, the processing circuitry 1301, and/or the handling circuit 1303 may be configured to, whereby if the received RRC message indicated mobility, resume the suspended SCG link.

The UE, the processing circuitry 1301, and/or the handling circuit 1303 may be configured to, whereby if the received RRC message not indicated mobility, not resume the suspended SCG link.

The UE, the processing circuitry 1301, and/or the handling circuit 1303 may be configured to, whereby if the received RRC message not including an explicit resume flag, not resume the suspended SCG link.

The UE, the processing circuitry 1301, and/or the handling circuit 1303 may be configured indicate to the MN 12 or the SN 13 in an RRC complete message that it has resumed the suspended SCG link.

The UE, the processing circuitry 1301, and/or the handling circuit 1303 may be configured to, upon detecting an SCG failure, and it has a pending RRC complete message to the last SCG reconfiguration received via SCG SRB, send the RRC complete message via the MN 12 (i.e. embedded via MN RRC message). This may be the case when a last reconfiguration is received directly from the secondary node 13.

The UE, the processing circuitry 1301, and/or the handling circuit 1303 may be configured to, after sending the complete message via the MN, send the SCG failure information to the MN 12. This may be the case when a last reconfiguration is received directly from the secondary node 13.

The UE, the processing circuitry 1301, and/or the handling circuit 1303 may be configured to, after sending the complete message via the MN, refrain sending the SCG failure information to the MN 12, if a last SCG message that it has just applied was a mobility message with the SN 13, and the UE 10 has successfully managed to apply it and resume the SCG, the UE, the processing circuitry 1301, and/or the handling circuit 1303 may be configured to discard the SCG failure information before sending it to the MN 12. This may be the case when a last reconfiguration is received directly from the secondary node 13.

The one or more conditions may comprise: reception of an RRC message embedded within an MN RRC message from the MN 12; the received RRC message indicates mobility or not; the UE 10 has a pending SCG reconfiguration; the received RRC message not including an explicit resume flag or includes an explicit resume flag; and/or has started to transmit RRC complete or not.

The handling may comprise: postponing transmission of indication of failure, refraining transmission of the indication of failure; sending complete message to the MN 12; applying reconfiguration; and/or resume or not resume suspended SCG link.

The UE 10 further comprises a memory 1305. The memory comprises one or more units to be used to store data on, such as signal strengths or qualities, IDs of radio network nodes, MSG configurations; SCG configurations, flags, applications to perform the methods disclosed herein when being executed, and similar.

The methods according to the embodiments described herein for the UE 10 are respectively implemented by means of e.g. a computer program 1306 or a computer program product, comprising instructions, i.e., software code portions, which, when executed on at least one processor, cause the at least one processor to carry out the actions described herein, as performed by the UE 10. The computer program 1306 may be stored on a computer-readable storage medium 1307, e.g. a disc, a USB stick or similar. The computer-readable storage medium 1307, having stored there on the computer program, may comprise the instructions which, when executed on at least one processor, cause the at least one processor to carry out the actions described herein, as performed by the UE 10. In some embodiments, the computer-readable storage medium may be a transitory or a non-transitory computer-readable storage medium.

Figure 14:
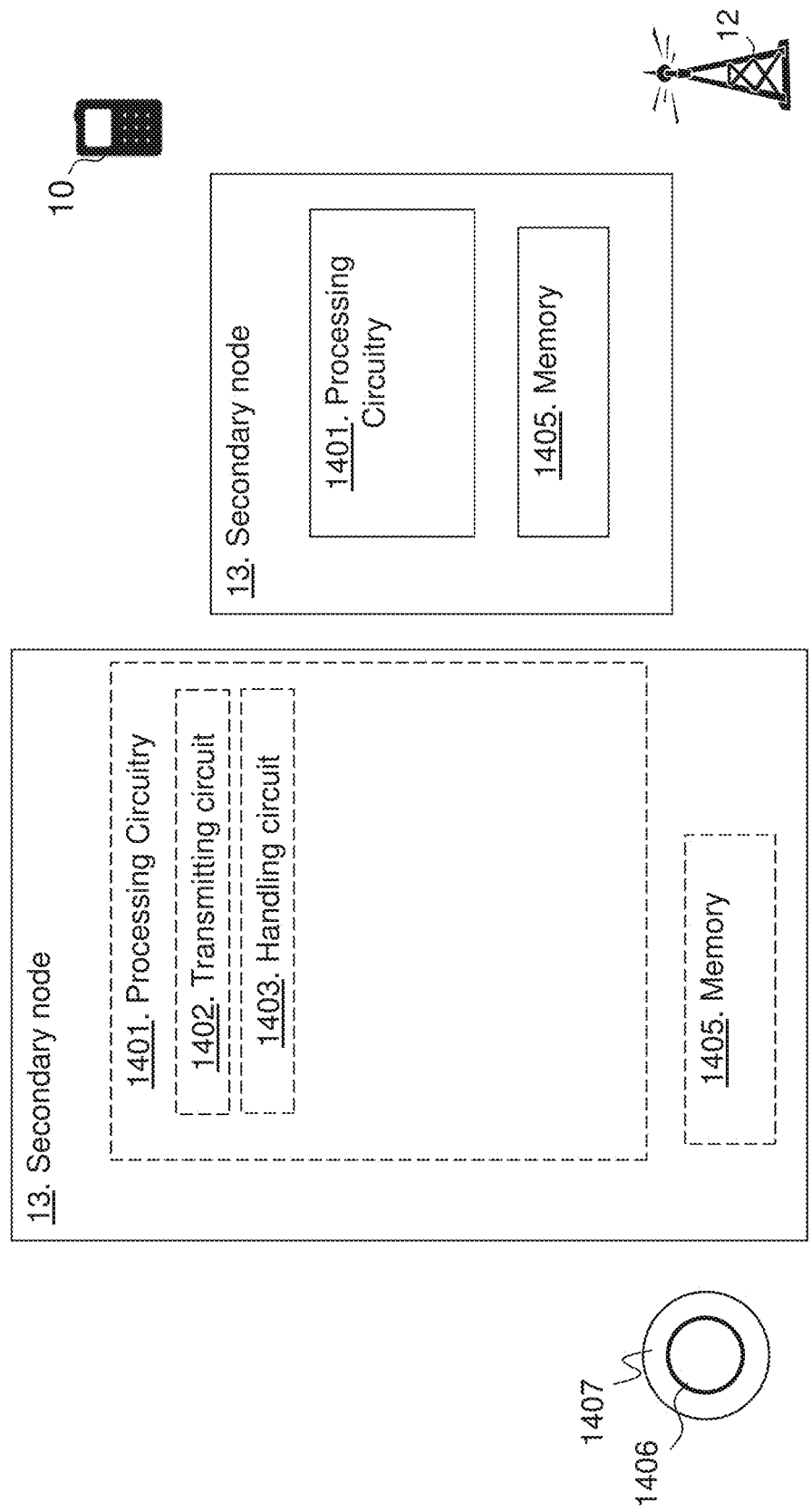
FIG. 14 shows a block diagram depicting a SN according to embodiments herein.

FIG. 14 is a block diagram depicting a second radio network node such as the secondary node 13 for handling communication the UE in the wireless communication network 1. The secondary node is configured to operate in cooperation with a master node to provide DC communication with the UE 10 through the secondary node 13 using the SCG over the second radio interface between the UE 10 and the secondary node 13 and the master node 12 using the MCG over the first radio interface between the UE 10 and the master node 12. E.g. the master node and the secondary node are configured for communicating with the UE 10. The master node 12 may be configured with the UE 10 with a first master configuration of bearers, i.e. a first MCG link, towards the master node and the UE 10 may further be configured with a first secondary configuration of bearers, i.e. first SCG link, towards the secondary node 13.

The SN 13 may comprise processing circuitry 1401, e.g. one or more processors, configured to perform the methods herein.

The SN 13 may comprise a transmitting circuit 1402, e.g. a transmitter or a transceiver. The SN 13, the processing circuitry 1401, and/or the transmitting circuit 1402 is configured to transmit to the user equipment, an SCG reconfiguration message that includes a mobility flag wherein the mobility flag is set to true when the reconfiguration concerns mobility within the secondary node and the mobility flag set to false or not included when the reconfiguration is not concerned with mobility within the secondary node. E.g. to transmit, upon sending a reconfiguration of the SCG to the UE 10 that is concerned with mobility within the SN 13 (e.g. SCell addition, PScell change, etc.), includes the flag indicating so to the MN 12. The indication flag may be an optional IE in the X2 RRC Transfer message, a value of TRUE indicating the embedded message is related to mobility and a value of FALSE or the lack of inclusion of the IE indicating the message is not related to mobility. The SN 13, the processing circuitry 1401, and/or the transmitting circuit 1402 may be configured to transmit to the user equipment 10 the SCG reconfiguration message.

The SN 13 may comprise a handling circuit 1403. The SN 13, the processing circuitry 1401, and/or the handling circuit 1403 may be configured to handle the SCG failure based on whether one or more conditions are fulfilled. The one or more conditions may comprise: upon getting a request to fetch an SCG configuration from the SN 13, if it has been waiting for a complete message to the last SCG reconfiguration that the SN 13 has sent via SCG SRB. The SN 13 may handle the SCG failure by e.g. respond to the MN 12 with a previous SCG configuration; and/or with an empty message.

The SN 13, the processing circuitry 1401, and/or the handling circuit 1403 may be configured to, upon getting a request to fetch an SCG configuration from the SN 13, if it has been waiting for a complete message to the last SCG reconfiguration that the SN 13 has sent via SCG SRB, respond to the MN 12 with a previous SCG configuration (i.e. the last SCG reconfiguration that the SN 13 has received a complete message to).

The SN 13, the processing circuitry 1401, and/or the handling circuit 1403 may be configured to, upon getting a request to fetch an SCG configuration from the SN 13, if the SN 13 has been waiting for a complete message to the last SCG reconfiguration that the SN 13 has sent via SCG SRB, respond to the MN 12 with an empty message (e.g. an empty SCG configuration) optionally indicating that it does not have a valid configuration.

The SN 13, the processing circuitry 1401, and/or the handling circuit 1403 may be configured to receive, from the master node 12, a request to fetch the SCG configuration before an RRC complete message corresponding to the SCG reconfiguration has been received. The SN 13, the processing circuitry 1401, and/or the handling circuit 1403 may be configured to transmit to the master node 12, a previous SCG configuration message that the UE was configured with before the SCG reconfiguration message was sent.

The SN 13 further comprises a memory 1405. The memory comprises one or more units to be used to store data on, such as signal strengths or qualities, IDs of radio network nodes, SCG configurations, flags, applications to perform the methods disclosed herein when being executed, and similar.

The methods according to the embodiments described herein for the SN 13 are respectively implemented by means of e.g. a computer program 1406 or a computer program product, comprising instructions, i.e., software code portions, which, when executed on at least one processor, cause the at least one processor to carry out the actions described herein, as performed by the SN 13. The computer program 1406 may be stored on a computer-readable storage medium 1407, e.g. a disc, a USB stick or similar. The computer-readable storage medium 1407, having stored there on the computer program, may comprise the instructions which, when executed on at least one processor, cause the at least one processor to carry out the actions described herein, as performed by the SN 13. In some embodiments, the computer-readable storage medium may be a transitory or a non-transitory computer-readable storage medium.

In some embodiments, the computer-readable storage medium may be a transitory or a non-transitory computer-readable storage medium, volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry. Device readable medium may store any suitable instructions, data or information, including a computer program, software, an application including one or more of logic, rules, code, tables, etc. and/or other instructions capable of being executed by processing circuitry and, utilized by the MN 12.

Processing circuitry may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other UE components, such as device readable medium functionality. Such functionality may include providing any of the various wireless features or benefits discussed herein. For example, processing circuitry may execute instructions stored in device readable medium or in memory within processing circuitry to provide the functionality disclosed herein.

According to an aspect the embodiments herein provide a method performed by a master node for handling communication in a wireless communication network. The master node and a secondary node, in the wireless communication network, are configured for communicating with the UE. The master node is configured with a first master configuration of bearers, e.g. signalling and/or data radio bearers, towards the UE and the UE has obtained a first secondary configuration of bearers, e.g. signalling or data radio bearers, related to the secondary node e.g. the UE has received a first secondary configuration of bearers towards the secondary node. I.e. the MN is configured with a MCG link to the UE and the UE configured for a SCG link to the SN e.g. UE has been configured with a secondary radio interface configuration associated with the secondary node. The master node receives an indication indicating failure of the first secondary configuration, e.g. radio conditions are not good enough to maintain communication over a radio interface to the secondary node. The MN handles the SCG failure or a reconfiguration of the configuration of bearers, i.e. reconfiguration of the SCG link, towards the secondary node based on whether one or more conditions are fulfilled. The one or more conditions may comprise: the MN has a pending reconfiguration for the UE of a second secondary configuration of bearers, i.e. the SCG link, towards the secondary node; a mobility flag is set to TRUE in a reconfiguration message from the SN; a mobility flag is set to FALSE in a reconfiguration message from the SN; has started to transmit a reconfiguration message before receiving the SCG failure; has transmitted a reconfiguration message but not yet received an reconfiguration response message before receiving the SCG failure; has transmitted a reconfiguration message and have received an reconfiguration response message before receiving the SCG failure, and a last SCG reconfiguration was sent directly via MN or not. The master node may handle the SCG failure by performing one or more of: postponing handling of the SCG failure; performing a reconfiguration to the second secondary configuration; ignoring the failure; moving the UE to a different SN; providing the SN with the an reconfiguration response message, e.g. when postponing the handling of the SCG failure.

According to another aspect embodiments herein provide a method performed by a UE for handling communication in a wireless communication network. The UE is configured for communicating with a master node and a secondary node with a first master configuration of bearers towards the master node and a first secondary configuration of bearers towards the secondary node. The UE detects failure of the first secondary configuration. The UE handles a reconfiguration of bearers, or SCG link, towards the secondary node, e.g. to a second or the first secondary configuration, based on whether one or more conditions are fulfilled. The one or more conditions may comprise: reception of an RRC message embedded within an MN RRC message from the MN or SN; the received RRC message indicates mobility or not; the UE 10 has a pending SCG reconfiguration; the received RRC message not including an explicit resume flag or includes an explicit resume flag; and/or has started to transmit RRC complete or not. The manner of handling the reconfiguration may comprise: postponing transmission of indication of failure, refraining transmission of the indication of failure; sending complete message to the MN; applying reconfiguration; and/or resuming or not resuming suspended SCG link, i.e. radio configuration of the secondary radio interface.

According to yet another aspect of embodiments herein a method performed by a secondary node for handling communication of a wireless device in a wireless network is herein provided. The secondary node and a master node, in the wireless communication network, are configured for communicating with the UE. The secondary node is configured with a first secondary configuration of bearers, i.e. a SCG link, towards the UE and the UE is further configured with a master configuration of bearers towards the master node. The secondary node transmits a mobility flag set to true or false in a reconfiguration message to the MN. The secondary node may further handle a reconfiguration procedure of bearers to the UE, e.g. to a second or the first secondary configuration, based on whether one or more conditions are fulfilled. The conditions may comprise: a last SCG reconfiguration was sent directly via SCG SRB; upon getting a request to fetch an SCG configuration and been waiting for a complete message to the last SCG reconfiguration that the SN has sent via SCG SRB. The conditions may also comprise: a last SCG reconfiguration was sent via MN node; upon getting a request to fetch an SCG configuration and been waiting for a complete message to the last SCG reconfiguration was sent via MN node. The SN may handle the reconfigurations procedure by: responding to the MN with a previous SCG configuration; or respond to the MN with an empty optionally indicating that it does not have a valid configuration.

Also, a master node, a UE and a secondary node are provided herein configured to perform the methods disclosed herein.

Figure 15:
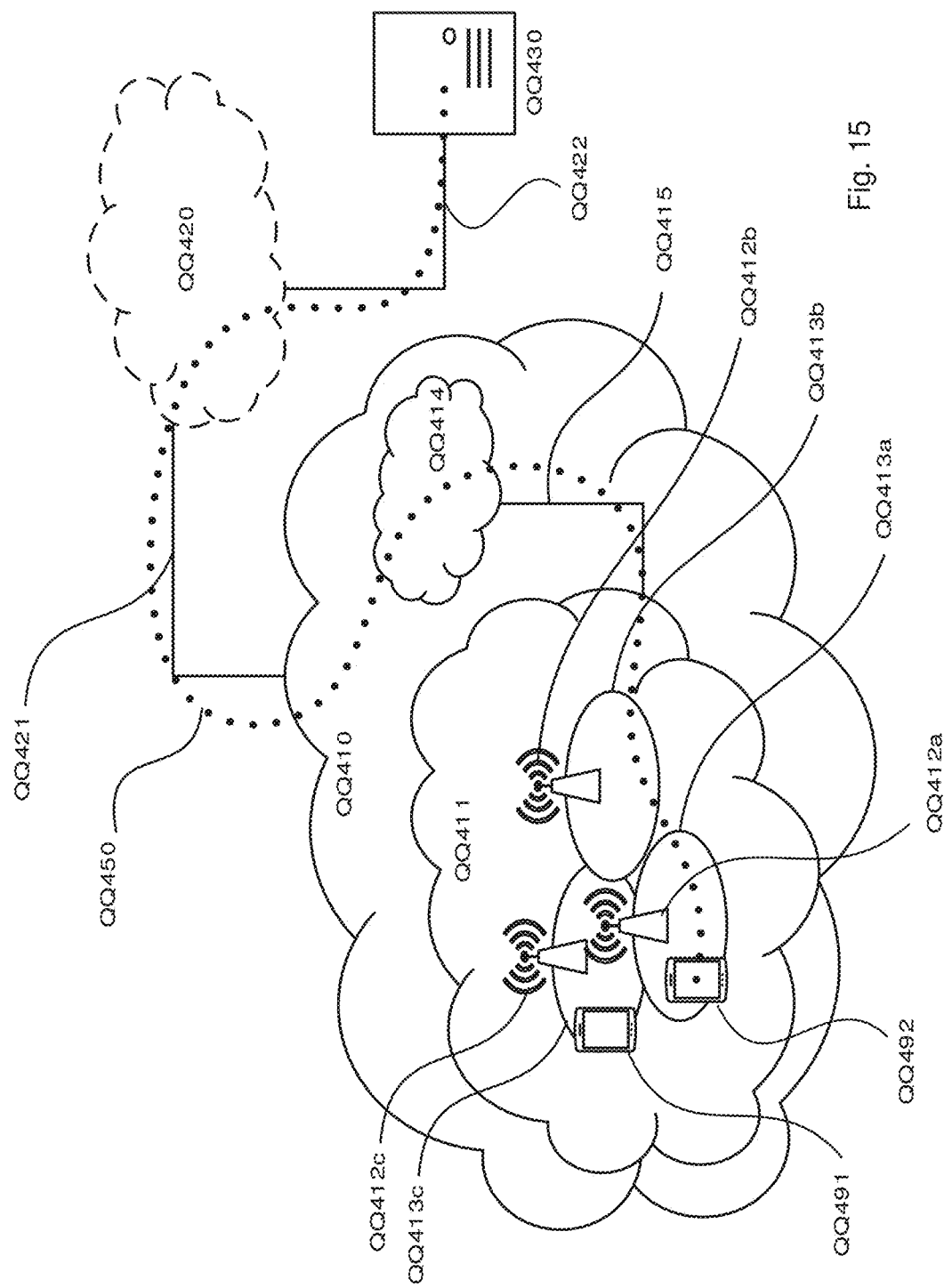
FIG. 15 shows a telecommunication network connected via an intermediate network to a host computer in accordance with some embodiments.

FIG. 15: Telecommunication network connected via an intermediate network to a host computer in accordance with some embodiments With reference to FIG. 15, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points being examples of the master and secondary nodes above, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 15 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signalling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 16:
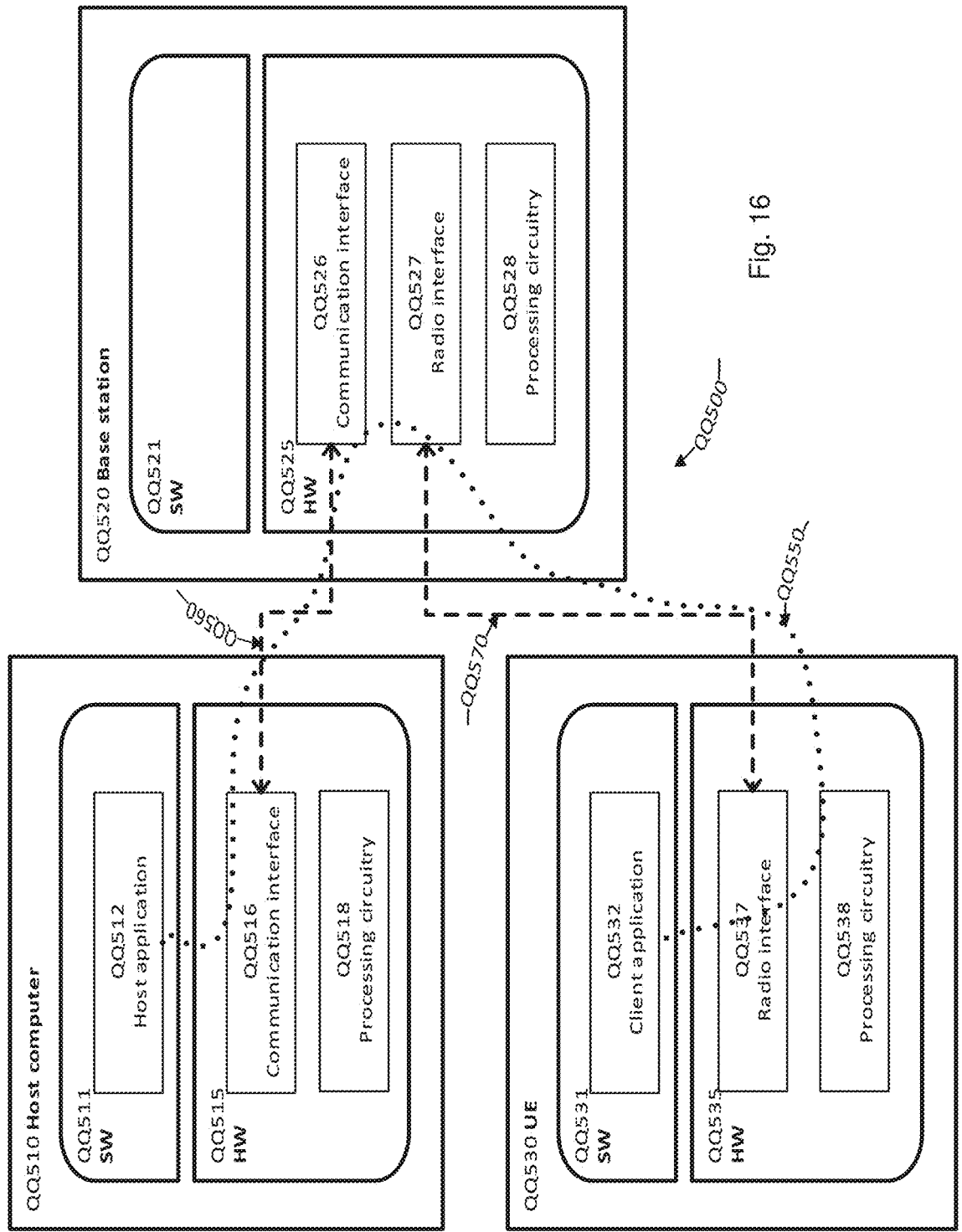
FIG. 16 shows a host computer communicating via a base station with a user equipment over a partially wireless connection in accordance with some embodiments.

FIG. 16: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 16. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 16) served by base station QQ520. Communication interface QQ526 may be configured to facilitate connection QQ560 to host computer QQ510. Connection QQ560 may be direct or it may pass through a core network (not shown in FIG. 16) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. It's hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 16 may be similar or identical to host computer QQ430, one of base stations QQ412a, QQ412b, QQ412c and one of UEs QQ491, QQ492 of FIG. 15, respectively. This is to say, the inner workings of these entities may be as shown in FIG. 16 and independently, the surrounding network topology may be that of FIG. 15.

In FIG. 16, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the latency since the SCG configuration of the UE is known and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signalling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 17:
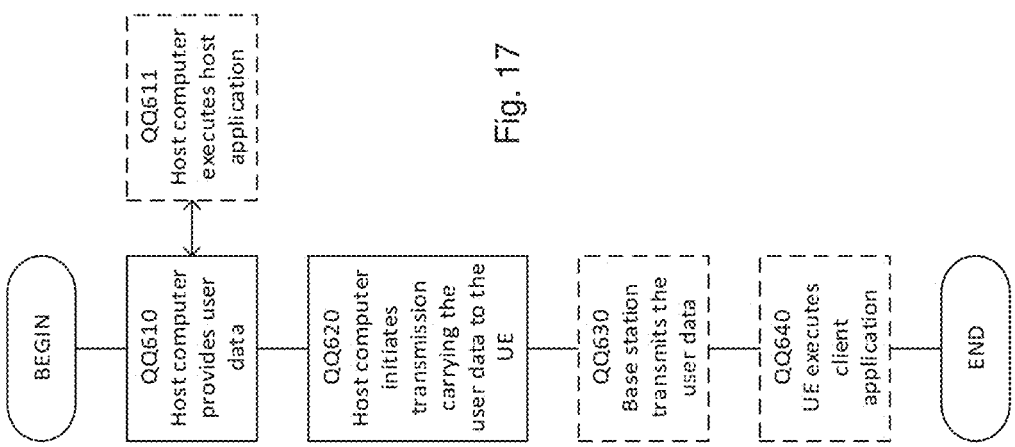
FIG. 17 shows methods implemented in a communication system including a host computer, a base station and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 18:
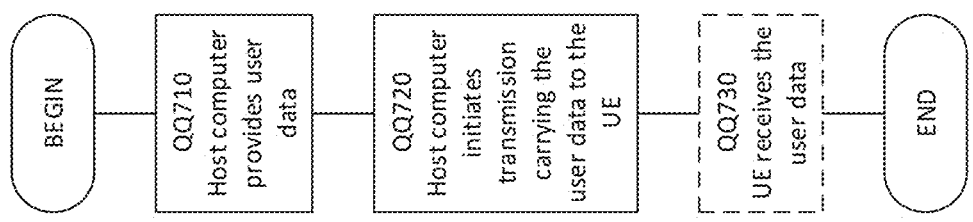
FIG. 18 shows methods implemented in a communication system including a host computer, a base station and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 19:
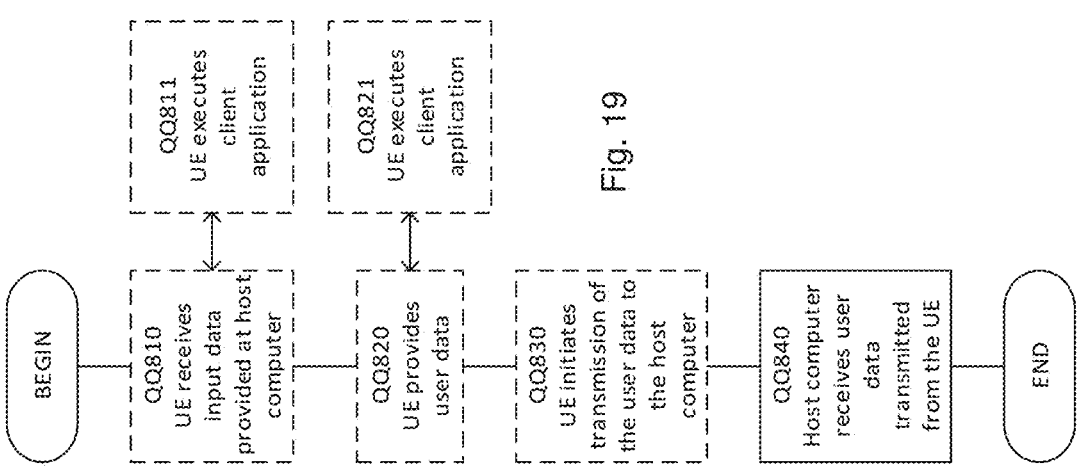
FIG. 19 shows methods implemented in a communication system including a host computer, a base station and a user equipment in accordance with some embodiments.

FIG. 19: Methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 20:
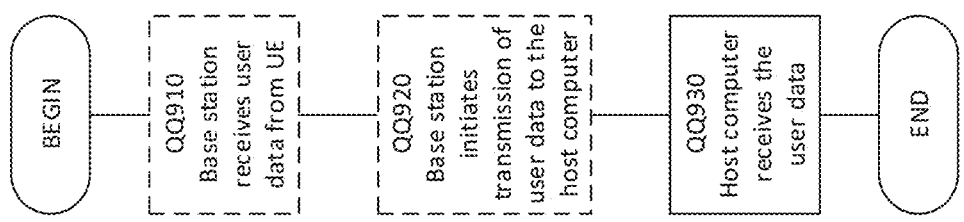
FIG. 20 shows methods implemented in a communication system including a host computer, a base station and a user equipment in accordance with some embodiments.

FIG. 20: Methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit or circuits to perform corresponding functions according one or more embodiments of the present disclosure.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Abbreviations

At least some of the following abbreviations may be used in this disclosure. If there is an inconsistency between abbreviations, preference should be given to how it is used above. If listed multiple times below, the first listing should be preferred over any subsequent listing(s).

ACK Acknowledgement
AP Application Protocol
BSR Buffer Status Report
CE Control Element
CP Control Plane
DC Dual Connectivity
DCI Downlink Control Information
DL Downlink
DRB Data Radio Bearer
eNB (EUTRAN) base station
E-RAB EUTRAN Radio Access Bearer
FDD Frequency Division Duplex
gNB NR base station
GTP-UGPRS Tunneling Protocol-User Plane
IP Internet Protocol
LTE Long Term Evolution
MCG Master Cell Group
MAC Medium Access Control
MeNB Master eNB
MgNB Master gNB
MN Master Node
NACK Negative Acknowledgement
NR New Radio
PDCP Packet Data Convergence Protocol
PUSCH Physical Uplink Shared Channel
RLC Radio Link Control
RLF Radio Link Failure
RRC Radio Resource Control
SCG Secondary Cell Group
SCTP Stream Control Transmission Protocol
SeNB Secondary eNB
S-SgNB Source Secondary gNB
SgNB Secondary gNB
SN Secondary Node
S-SN Source Secondary Node
SR Scheduling Request
SRB Signalling Radio Bearer
TDD Time Division Duplex
TEID Tunnel Endpoint IDentifier
TNL Transport Network Layer
T-SgNB Target Secondary gNB
T-SN Target Secondary Node
UCI Uplink Control Information
UDP User Datagram Protocol
UE User Equipment
UL Uplink
UP User Plane
URLLC Ultra Reliable Low Latency Communication
X2 Interface between base stations

What is claimed is:

1. A method performed by a user equipment (UE) for handling communication in a wireless communication network, providing dual connectivity (DC) communication through a master node using a master cell group (MCG) over a first radio interface between the UE and the master node and through a secondary node using a secondary cell group (SCG) over a second radio interface between the UE and the secondary node, the method comprising:
   detecting a failure associated with the SCG;
   suspending actions associated with the SCG;
   receiving an MCG radio resource control (RRC) message including an embedded SCG RRC message that includes an SCG configuration;
   determining whether to apply the SCG configuration based at least in part on whether the UE has started to transmit a RRC complete message;
   performing a reconfiguration of the SCG based at least in part on the determination whether to apply the SCG configuration; and one of resuming and not resuming the suspended actions associated with the SCG.

2. The method according to claim 1, wherein the first radio interface is using a first radio access technology and the second radio interface is using a second radio access technology, and wherein the first radio access technology is different from the second radio access technology.

3. The method according to claim 1, wherein performing the reconfiguration of the SCG comprises sending the RRC complete message for the SCG one of directly to the secondary node and embedded within an RRC message to the master node.

4. The method according to claim 1, wherein performing the reconfiguration of the SCG comprises resuming the suspended actions by resuming at least one of:
- a SCG link;
- a SCG part of a split data radio bearer;
- a SCG signalling radio bearer;
- at least one of a transmission and reception over SCG radio; and
- one of a transmission of data and control signalling to the secondary node.

5. A user equipment (UE) for handling communication in a wireless communication network providing dual connectivity (DC) communication through a master node using a master cell group (MCG) over a first radio interface between the UE and the master node and through a secondary node using a secondary cell group (SCG) over a second radio interface between the UE and the secondary node, the UE comprising processing circuitry configured to:
- detect a failure associated with the SCG;
- suspend actions associated with the SCG;
- receive an MCG radio resource control (RRC) message including an embedded SCG RRC message that includes an SCG configuration;
- determine whether to apply the SCG configuration based at least in part on whether the UE has started to transmit a RRC complete message;
- perform a reconfiguration of the SCG based at least in part on the determination whether to apply the SCG configuration; and
- one of resume and not resume the suspended actions associated with the SCG.

6. The UE according to claim 5, wherein the first radio interface is using a first radio access technology and the second radio interface is using a second radio access technology, and wherein the first radio access technology is different from the second radio access technology.

7. The UE according to claim 5, wherein the processing circuitry is further configured to perform the reconfiguration of the SCG by being configured to send the RRC complete message for the SCG one of directly to the secondary node and embedded within an RRC message to the master node.

8. The UE according to claim 5, wherein the processing circuitry is further configured to perform the reconfiguration of the SCG by being configured to resume the suspended actions associated with the SCG by resuming at least one of:
- a SCG link;
- a SCG part of a split data radio bearer;
- a SCG signalling radio bearer;
- at least one of a transmission and reception over SCG radio; and
- one of a transmission of data and control signalling to the secondary node.

\* \* \* \* \*